(12) United States Patent
Miyashita et al.

(10) Patent No.: US 7,164,546 B2
(45) Date of Patent: Jan. 16, 2007

(54) LENS SHIFT MECHANISM AND PROJECTION TYPE VIDEO DISPLAY

(75) Inventors: Yoshiaki Miyashita, Osaka (JP); Hiroki Koba, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 43 days.

(21) Appl. No.: 10/419,777

(22) Filed: Apr. 22, 2003

(65) Prior Publication Data

US 2004/0080836 A1    Apr. 29, 2004

(30) Foreign Application Priority Data

Apr. 24, 2002 (JP) .............................. 2002-122590
Aug. 27, 2002 (JP) .............................. 2002-247087

(51) Int. Cl.
*G02B 7/02* (2006.01)

(52) U.S. Cl. ................... 359/813; 359/822; 353/101

(58) Field of Classification Search ............... 359/819, 359/822, 823, 694–706, 813, 557; 353/100, 353/101; 396/144
See application file for complete search history.

(56) References Cited

U.S. PATENT DOCUMENTS

| | | | | |
|---|---|---|---|---|
| 4,183,636 A | * | 1/1980 | Besenmatter et al. | 353/101 |
| 4,408,830 A | * | 10/1983 | Wutherich | 359/813 |
| 4,618,221 A | * | 10/1986 | Thomas | 359/428 |
| 4,655,548 A | * | 4/1987 | Jue | 348/373 |
| 5,194,993 A | * | 3/1993 | Bedzyk | 359/813 |
| 6,364,491 B1 | * | 4/2002 | Okada et al. | 353/101 |
| 6,547,402 B1 | * | 4/2003 | Masuda | 353/101 |
| 6,773,117 B1 | * | 8/2004 | Watanabe | 353/101 |
| 2002/0044264 A1 | * | 4/2002 | Lu | 353/101 |

FOREIGN PATENT DOCUMENTS

| | | |
|---|---|---|
| JP | 02-240644 | 9/1990 |
| JP | 5-21246 | 3/1993 |
| JP | 05-249409 | 9/1993 |
| JP | 11-327043 | 11/1999 |
| JP | 2000-333103 | 11/2000 |
| JP | 2001-201792 | 7/2001 |
| JP | 2001-215610 | 8/2001 |
| JP | 2001-330887 | 11/2001 |
| JP | 2002-182213 | 6/2002 |

OTHER PUBLICATIONS

Japanese Office Action dated Mar. 16, 2006.

* cited by examiner

*Primary Examiner*—Alessandro Amari
(74) *Attorney, Agent, or Firm*—Westerman, Hattori, Daniels & Adrian, LLP.

(57) ABSTRACT

A lens mounting plate to which a projection lens unit is fixed is brought into contact with a sliding base. The lens mounting plate is pressed against the sliding base by the urging of a coiled spring. The pressing force is set such that the position of the projection lens unit can be held and shifted. A cover is provided with a pipe-shaped projection so as to surround the projection lens unit with a clearance corresponding to the shifting width of the projection lens unit between the pipe-shaped projection and the projection lens unit. A user shifts the position of the projection lens unit with his or her fingers laid on the pipe-shaped projection and the projection lens unit.

35 Claims, 17 Drawing Sheets

Fig. 1
(a)
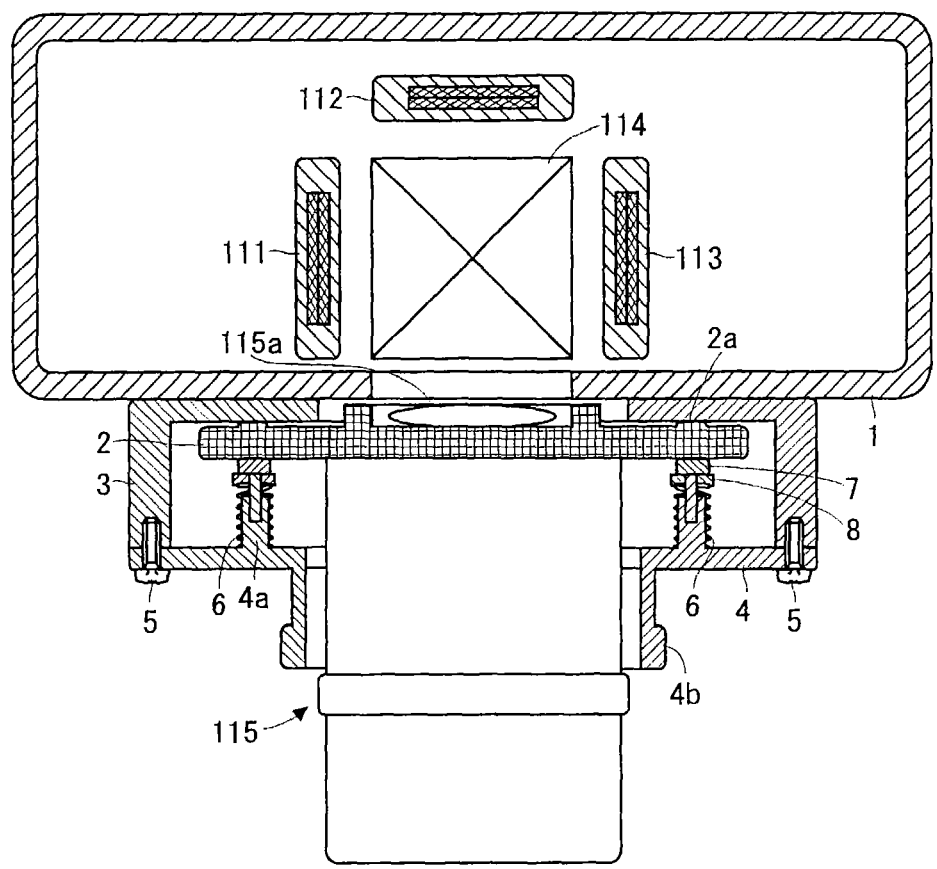
(b)
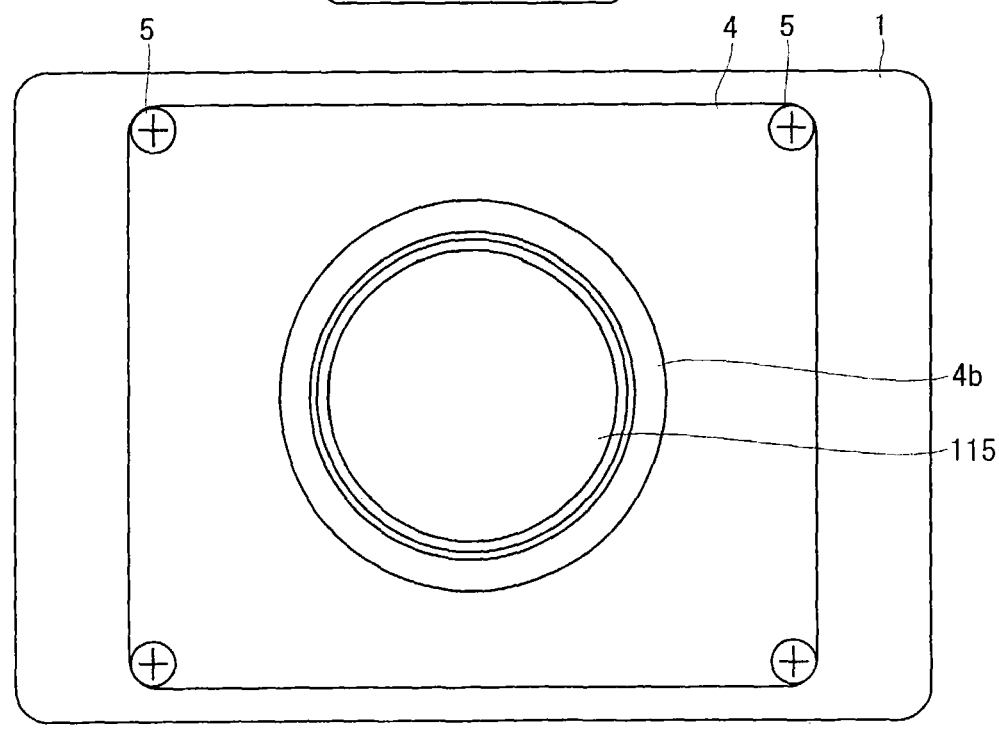

Fig. 2
(a)
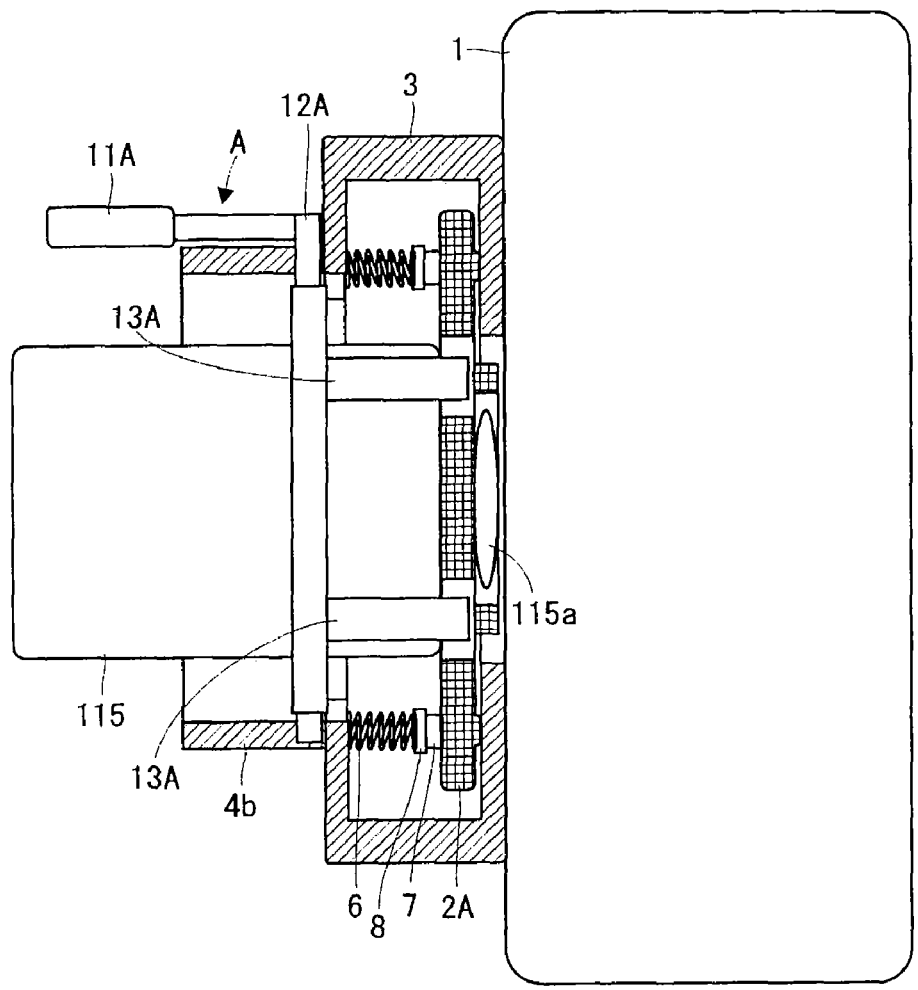
(b)
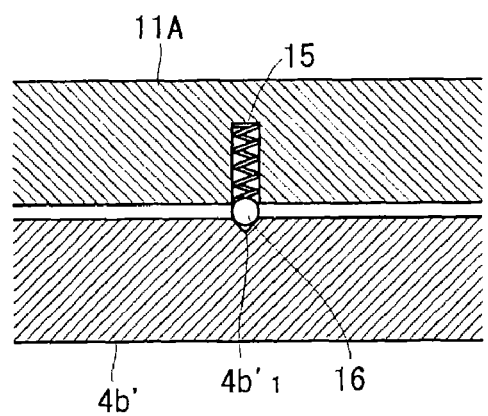

Fig. 4
(a)
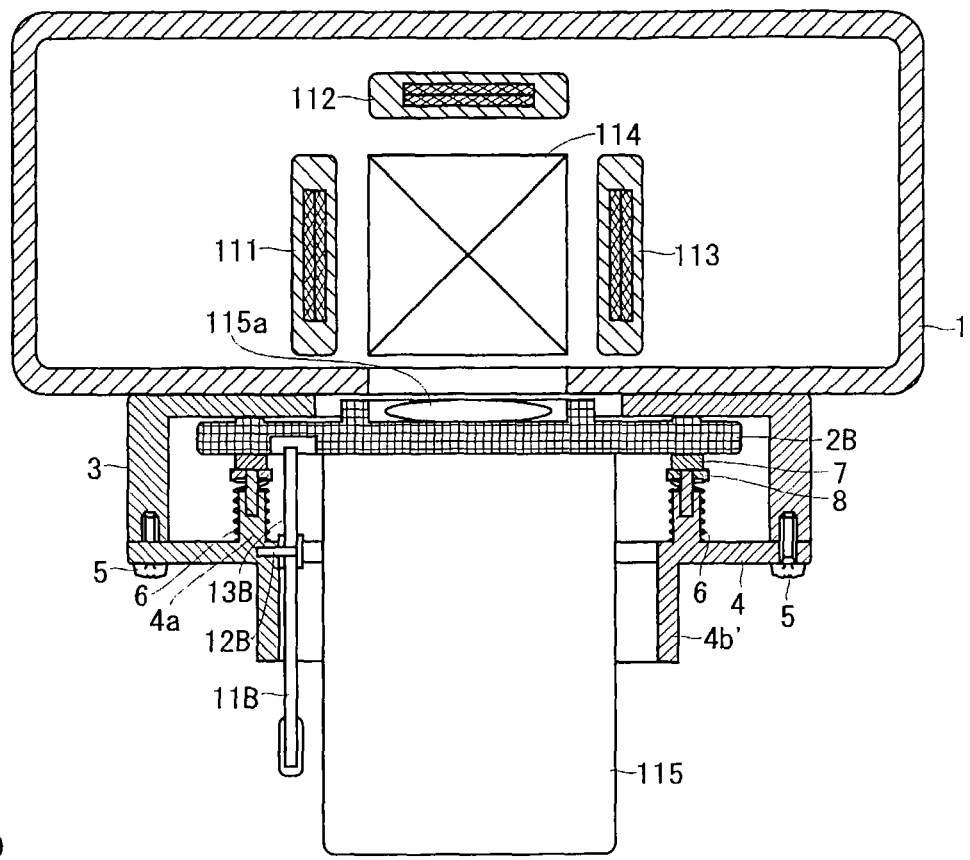
(b)
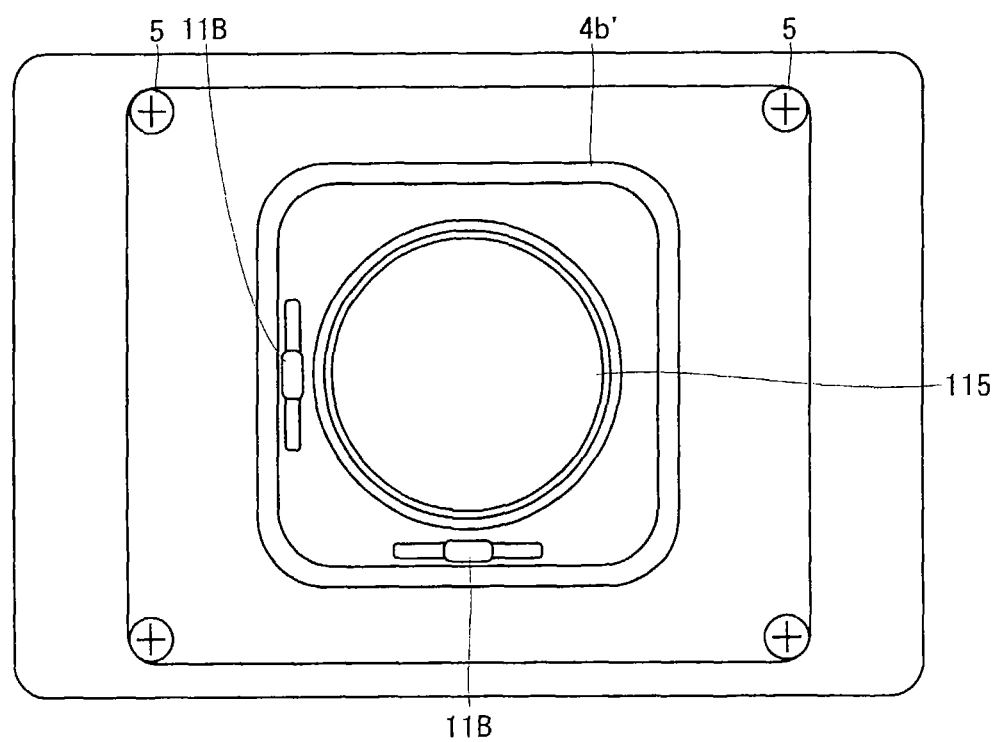

Fig. 6
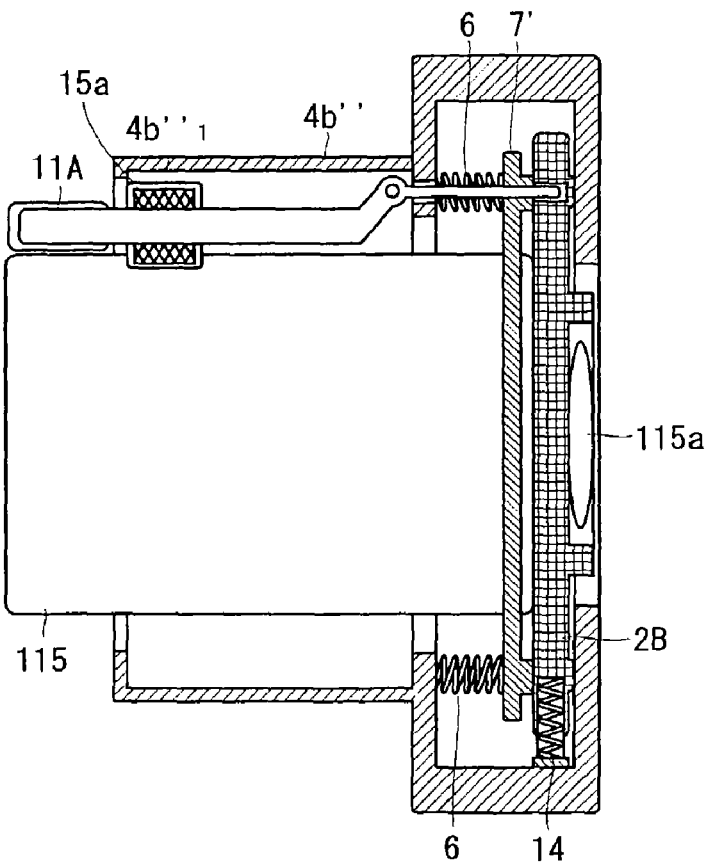
(a)
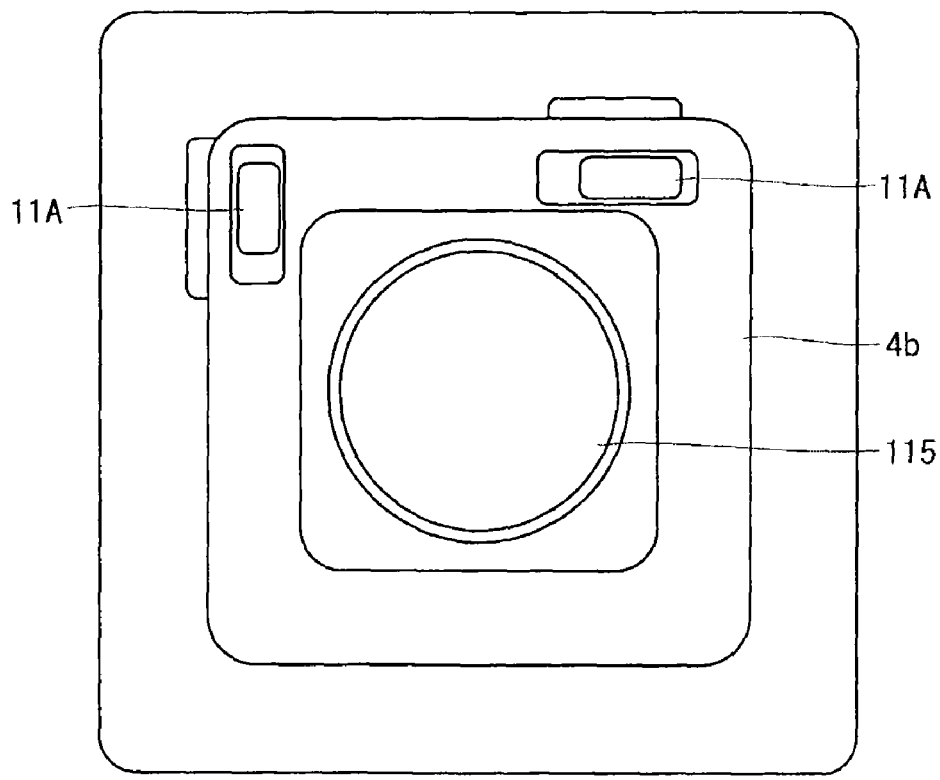
(b)

Fig. 7
(a)
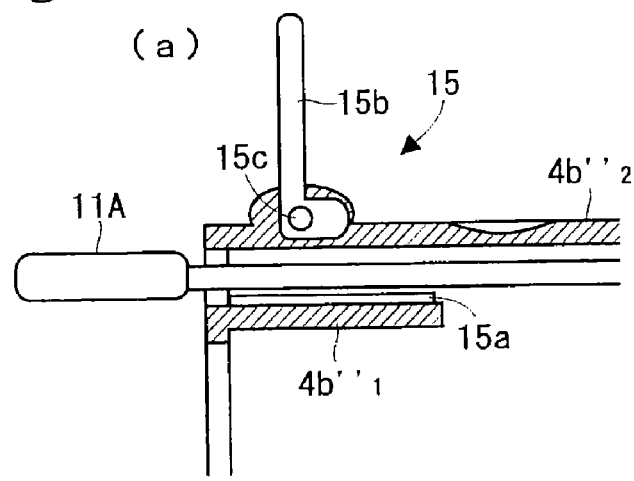
(b)
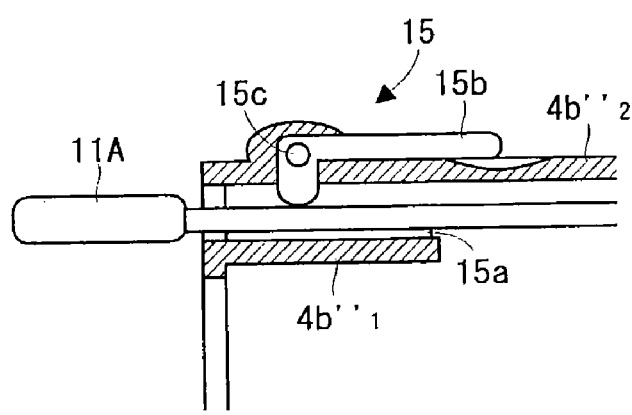
Fig. 8
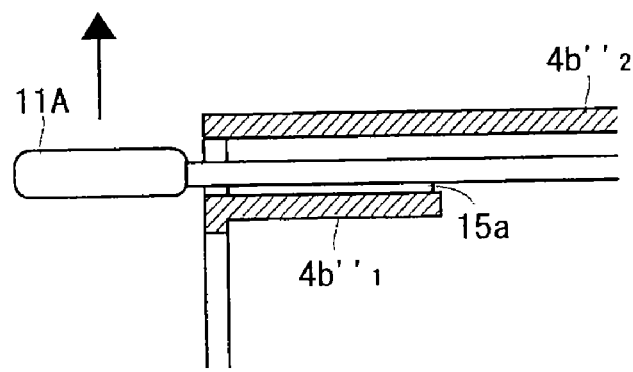

Fig. 10
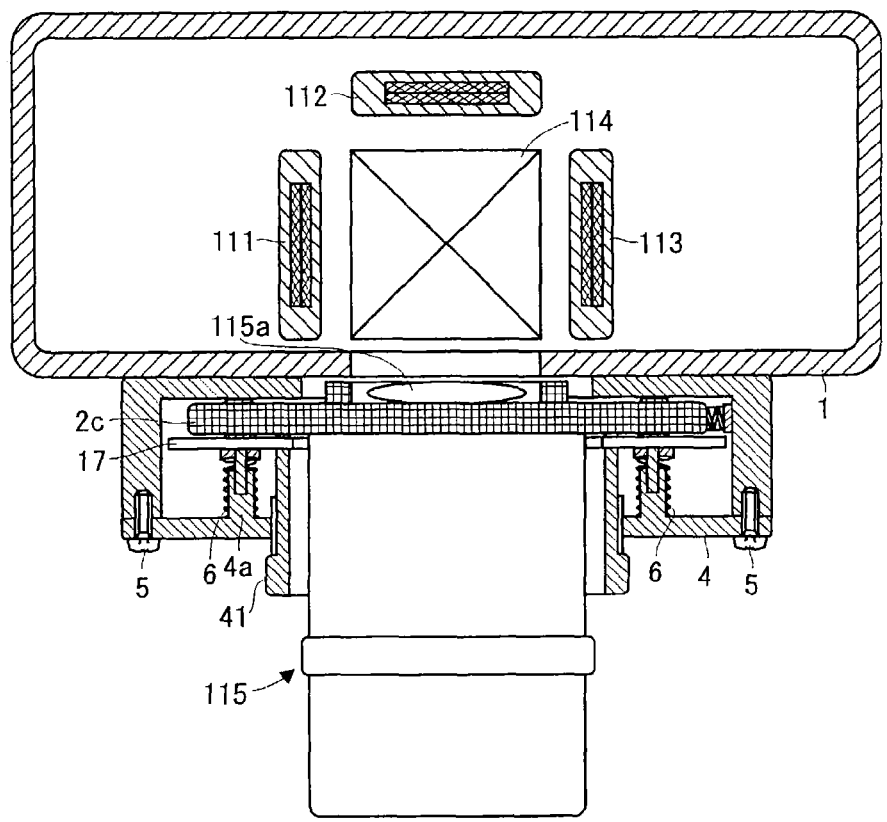
(a)
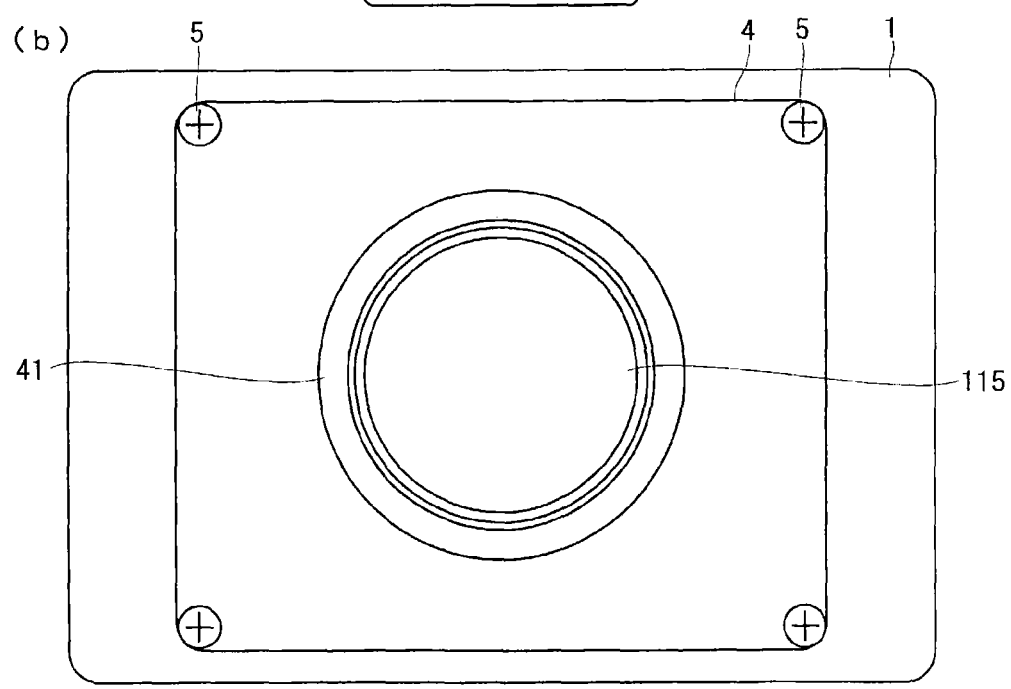
(b)

Fig. 12
(a)
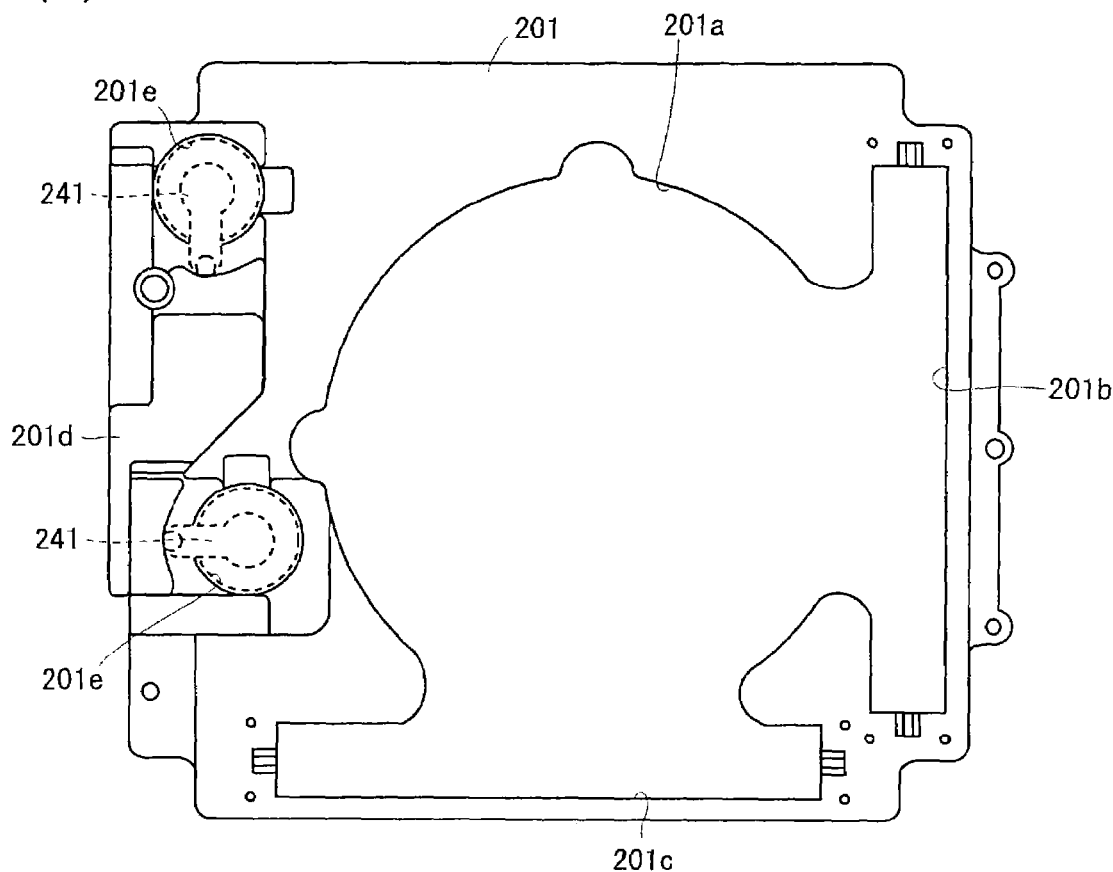
(b)
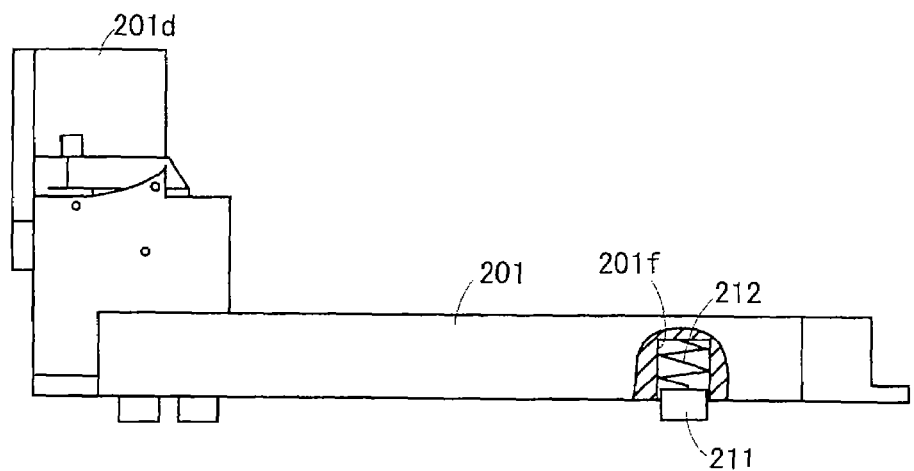

Fig. 13
(a)
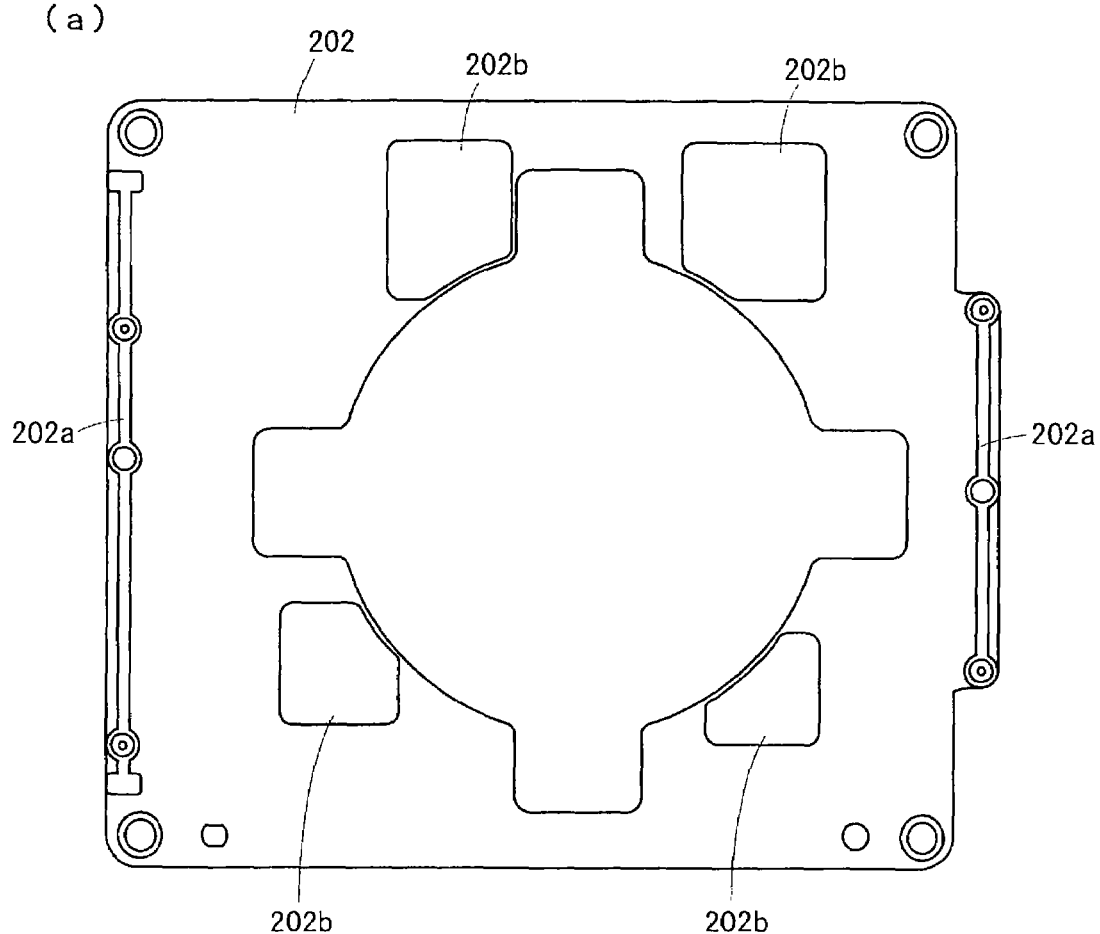
(b)
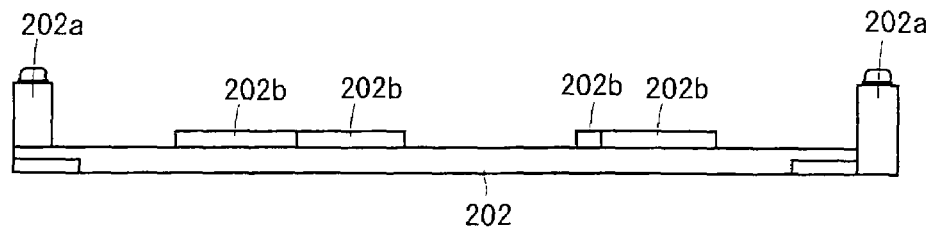

Fig. 14
(a)
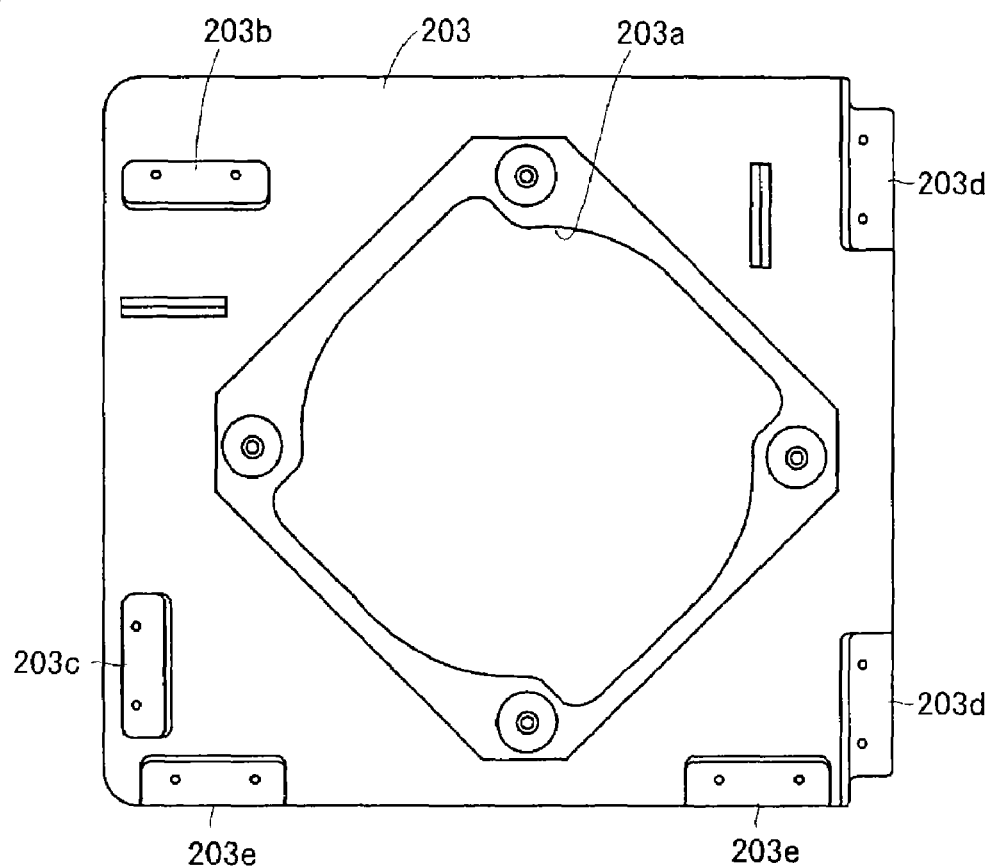
(b)
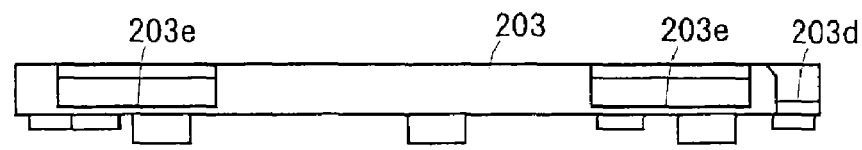

LENS SHIFT MECHANISM AND PROJECTION TYPE VIDEO DISPLAY

BACKGROUND OF THE INVENTION

Field of the Invention

The present invention relates to a lens shift mechanism and a projection type video display.

FIG. 18 is a diagram illustrating an example of an optical system in a three-plate color liquid crystal projector. A light emitter in a light source 301 is composed of an ultra-high pressure mercury lamp, a metal halide lamp, a xenon lamp, or the like, and light irradiated therefrom is emitted after being changed into parallel light by a parabola reflector, and is introduced into an integrator lens 302.

The integrator lens 302 comprises a pair of groups of lenses, and each pair of lenses introduces the light emitted from the light source 301 into the whole surfaces of liquid crystal light valves 311, 312, and 313. Light which has passed through the integrator lens 302 is introduced into a first dichroic mirror 303.

The first dichroic mirror 303 transmits light in a red wavelength band, while reflecting light in a cyan (green+blue) wavelength band. The light in the red wavelength band which has passed through the first dichroic mirror 303 is reflected on a total reflecting mirror 304 so that its optical path is changed. The red light which has been reflected on the total reflecting mirror 304 is optically modulated by passing through the light transmission-type liquid crystal light valve for red 311 through a condenser lens 308. On the other hand, the light in the cyan wavelength band which has been reflected on the first dichroic mirror 303 is introduced into a second dichroic mirror 305.

The second dichroic mirror 305 transmits light in a blue wavelength band, while reflecting light in a green wavelength band. The light in the green wavelength band which has been reflected on the second dichroic mirror 305 is introduced into the light transmission-type liquid crystal light valve for green 312 through a condenser lens 309, and is optically modulated by passing through the liquid crystal light valve 312. The light in the blue wavelength band which has passed through the second dichroic mirror 305 is introduced into the light transmission-type liquid crystal light valve for blue 313 through total reflecting mirrors 306 and 307 and a condenser lens 310, and is optically modulated by passing through the liquid crystal light valve 313.

Each of the liquid crystal light valves 311, 312, and 313 comprises an incidence-side polarizing plate, a panel constructed by sealing a liquid crystal between a pair of glass boards (where a pixel electrode and an alignment film is formed), and an emission-side polarizing plate. Modulated light beams (image light beams in respective colors) which have been respectively modulated by passing through the liquid crystal light valves 311, 312, 313 are synthesized by a dichroic prism 314, to obtain color image light. The color image light is projected in enlarged fashion by a projection lens unit 315, and is projected on a screen.

FIG. 19 is a perspective view showing a lens shift mechanism (lens shifting mechanism) for moving the above-mentioned projection lens unit 315 up and down. The lens shift mechanism makes it possible to move a projected image up and down without a main body of the liquid crystal projector moving and to alleviate the change of the projected image into a trapezoidal shape.

Sliding bearings 321a are provided at four corners of a moving base 321 to which the projection lens unit 315 is fixed, a guide shaft 322 is inserted through each of the sliding bearings 321a, and the moving base 321 is guided up and down along the guide shaft 322. A plate 321b is fixed to the side of the moving base 321. A screw hole is formed in the plate 321b, and a male screw 323a in an up-and-down shaft 323 is screwed into the screw hole. The screw shaft 323 is supported at the top and the bottom thereof by a bearing 324 such that the rotation thereof is allowed and the up-and-down movement thereof or the like is not made. The bearing 324 and the guide shaft 322 are fixed to a fixed base 329. A worm gear 325 is fixed to a lower end of the screw shaft 323, and a worm screw 326 fixed to a rotating shaft of the motor 327 is screwed into the worm gear 325. By the rotation of the rotating shaft of the motor 327, the screw shaft 323 is rotated so that the plate 321b is raised and lowered, and the moving base 321 connected to the plate 321b is raised and lowered.

In the above-mentioned lens shift mechanism, in order to smoothly raise and lower the moving base 321, used as the guide shaft 322 is one made of metal such as stainless steel and smoothly ground, and used as the bearing 321a is resin such as polyacetal (POM) or an oilless bearing. In order to reduce the deflection of the guide shaft 322 in a case where the moving base 321 is raised and lowered, however, a clearance between the guide shaft 322 and the bearing 321a must be reduced. Further, high precision is required for the distances and the degrees of parallelization from a reference surface of the moving base 321 to the four bearings 321a and the distance and the degree of parallelization from a reference surface of the fixed base 329 to the guide shaft 322. When their tolerances are reduced, the moving base 321 cannot be smoothly raised and lowered by the unevenness in components and a cumulative error.

If an attempt to realize the up-and-down and right-and-left movement of the projection lens unit 315 by the lens shift mechanism having the above-mentioned conventional configuration is made, two sets of constituent elements, such as the moving base 321, the guide shaft 322, the sliding bearing 321a, and the screw shaft 323, for up-and-down shifting and for right-and-left shifting are required, thereby increasing the number of components, increasing the weight, and degrading the assembly workability.

SUMMARY OF THE INVENTION

In order to view the above-mentioned circumstances, an object of the present invention is to provide a lens shift mechanism (lens shifting mechanism) whose configuration is not complicated even when a projection lens unit is shifted up and down and right and left and which can easily perform a shifting operation and a projection type video display comprising the lens shift mechanism.

In order to solve the above-mentioned problem, in a lens shift mechanism for shifting a projection lens unit for projecting an image in a direction perpendicular to its optical axis, a lens shift mechanism according to the present invention is characterized by comprising a lens mounting member to which the projection lens unit is fixed; a contact member with which the lens mounting member is brought into contact; and pressing mechanism for pressing the lens mounting member against the contact member and set such that the pressing force can hold and shift the position of the projection lens unit (hereinafter referred to as a first configuration).

In the above-mentioned configuration, the guide shaft, the sliding bearing, the screw shaft, and so on in the lens shift mechanism having the above-mentioned conventional configuration are not required. Even when the projection lens unit is shifted up and down and right and left, therefore, the configuration is not easily complicated.

In the first configuration, the lens shift mechanism may be so configured that a pipe-shaped projection is provided so as to surround the projection lens unit, and there is a clearance corresponding to the shifting width of the projection lens unit between the pipe-shaped projection and the projection lens unit.

When a pressing force for holding the position of the projection lens unit is set herein, a projection type video display, equipped with the lens shift mechanism, itself may move when a user attempts to merely shift the position of the projection lens unit with the projection lens unit in his or her hand. In the configuration in which the pipe-shaped projection is provided, as described above, the user can shift the position of the projection lens unit with his or her fingers laid on the pipe-shaped projection and the projection lens unit, thereby making it possible to prevent the projection type video display itself from being moved.

In the first configuration or the configuration in which the pipe-shaped projection is provided, the lens shift mechanism may be so configured that there is provided a rotating member to which a lever operated by a user is attached, an operating part is formed in the rotating member, the operating part is engaged with the lens mounting member, and the position of the projection lens unit is shifted by operating the lever (hereinafter referred to as a second configuration).

In the second configuration, the position of the projection lens unit can be shifted by operating the lever, so that the shifting operation is easy. Further, the shifting direction is a direction perpendicular to the rotating shaft of the rotating member, thereby making it possible to improve the movement linearity of the projection lens unit.

In the lens shift mechanism having the second configuration, there may be provided stopper means for fixing a member related to the shifting operation of the lens mounting member.

For example, the lens shift mechanism may be so configured that the lever is provided, spaced apart from a friction member, and the user operates a movable member so that the movable member can press the lever against the friction member to fix the lever.

Furthermore, the lens shift mechanism may be so configured that the lever is provided in contact with the friction member, and the user can rotate the lever by lifting the lever off the friction member.

In the first configuration or the configuration in which the pipe-shaped projection is provided, the lens shift mechanism may be so configured that there is provided a rotating member to which a lever is attached, an operating part is formed in the rotating member, the operating part is engaged with the lens mounting member, the lever is connected to a lever driving screw mechanism, and the lever is rotated by the lever driving screw mechanism so that the position of the projection lens unit can be shifted (hereinafter referred to as a third configuration).

In the third configuration, the projection lens unit can be shifted by the lever driving screw mechanism, so that the shifting operation is easy. Further, the shifting direction is a direction perpendicular to the rotating shaft of the rotating member, thereby making it possible to improve the movement linearity of the projection lens unit. Further, the lever is connected to the lever driving screw mechanism, thereby making it possible for the lever itself to have the function of fixing the lever at its arbitrary position.

In the third configuration, the lens shift mechanism may be so configured that the lever driving screw mechanism is operated by the user.

Furthermore, in the third configuration, the lens shift mechanism may be so configured that the lever driving screw mechanism is driven by an actuator.

In the second configuration, the third configuration, or the configurations dependent thereon, the lens shift mechanism may be so configured that a concave area or a convex area is formed on a surface of a member in contact with or in close proximity to a surface of the lever, and the lever is lightly locked in the concave area or the convex area to such an extent that the rotation thereof is not prevented.

In such a configuration, the lever is easy to position in a portion where the concave area or the convex area is formed, thereby making it possible to accurately position the projection lens unit.

In the second configuration, the third configuration, or the configurations dependent thereon, the rotating member may be provided at a position where an extension of its rotating shaft does not cross the projection lens unit.

In such a configuration, used as the rotating member can be a long one, a point of action by the operating part can be positioned on the center line in the movement of the lens mounting member, and an offset can be eliminated in application of a force for moving the lens mounting member. Accordingly, in moving the projection lens unit straight, the accuracy thereof is further improved.

In the second configuration, the third configuration, or the configurations dependent thereon, the rotating member may be provided at a position where an extension of its rotating shaft crosses the projection lens unit.

In such a configuration, the lever can be arranged close to the position of the projection lens unit, so that an apparent compact impression of the lens shift mechanism is improved, thereby an appearance can be made better.

In any one of the above-mentioned lens shift mechanisms, urging means for urging the lens mounting member may be provided opposite to the direction of the own weight of the projection lens unit.

Consequently, it is possible to prevent the position of the projection lens unit from being shifted by the own weight.

In a lens shift mechanism for shifting a projection lens unit for projecting an image in a direction perpendicular to its optical axis, a lens shift mechanism according to the present invention is characterized by comprising a lens mounting member to which the projection lens unit is fixed; a contact member with which the lens mounting member is brought into contact; pressing mechanism for pressing the lens mounting member against the contact member and set such that the pressing force can hold and shift the position of the projection lens unit; a dial operated in a direction conforming to the shifting direction; and a driving mechanism for moving the lens mounting member in the direction in which the dial is operated upon receipt of a force for operating the dial.

In the above-mentioned configuration, the guide shaft, the sliding bearing, and so on in the lens shift mechanism having the conventional configuration are not required. Even when the projection lens unit is shifted up and down and right and left, therefore, the configuration is not easily complicated. Moreover, the dial operated in the direction conforming to the shifting direction and the driving mechanism for moving the lens mounting member in the dial operation direction upon receipt of the force for operating the dial are provided. If it is desired to shift the projection lens unit rightward, therefore, a rightward operating force may be applied to the dial. On the other hand, if it is desired to shift the projection lens unit upward, an upward operating force may be applied to the dial. Therefore, the user can perform the lens shifting operation without having an uncomfortable feeling.

The lens shift mechanism may be so configured that the driving mechanism has a rotating member having a rotation center parallel to the optical axis, the rotating member is provided with a projection at a position eccentric from the rotation center, and the projection is engaged with the lens mounting member.

The lens shift mechanism may be so configured that the dial is provided with a screw, a moving member is screwed into the screw, and the rotating member is rotated by the movement of the moving member.

There may be provided two driving mechanisms such that the projection lens unit is moved up and down and right and left.

The lens shift mechanism may be so configured that there are provided a first guiding member for guiding the projection lens unit up and down and a second guiding member for guiding the projection lens unit right and left, a guide projection in each of the guiding members is engaged with a guiding hole formed in the lens mounting member, the first guiding member has an axis in the vertical direction and is provided so as to be swingable right and left, and the second guiding member has an axis in the horizontal direction and is provided so as to be swingable up and down.

In a projection type video display for optically modulating light emitted from a light source in a light valve and projecting an image in a projection lens unit, a projection type video display according to the present invention is characterized by comprising any one of the above-mentioned lens shift mechanisms.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing a lens shift mechanism of such a type that a projection lens unit is directly shifted according to the present invention, where FIG. 1 (*a*) is a horizontal sectional view, and FIG. 1 (*b*) is a front view;

FIG. 2 (*a*) is a vertical sectional view of the lens shift mechanism shown in FIG. 1, and FIG. 2 (*b*) is an enlarged view taken along an arrow A;

FIG. 4 is a diagram showing another example of a lens shift mechanism of a lever operation type according to the present invention, where FIG. 4 (*a*) is a horizontal sectional view, and FIG. 4 (*b*) is a front view;

FIG. 6 (*a*) is a vertical sectional view of the lens shift mechanism shown in FIG. 5, and FIG. 6 (*b*) is a front view thereof;

FIGS. 7 (*a*) and 7 (*b*) are diagrams for explaining the function of the lens shift mechanism shown in FIG. 5;

FIG. 8 is an explanatory view showing another example of a stopper mechanism;

FIG. 10 is a diagram showing a lens shift mechanism with a stopper function of such a type that a projection lens unit is directly shifted according to the present invention, where FIG. 10 (*a*) is a horizontal sectional view, and FIG. 10 (*b*) is a front view;

FIG. 12 is a diagram showing a first stationary plate member, where FIG. 12 (*a*) is a plan view, and FIG. 12 (*b*) is a side view;

FIG. 13 is a diagram showing a second stationary plate member, where FIG. 13 (*a*) is a plan view, and FIG. 13 (*b*) is a side view;

FIG. 14 is a diagram showing a lens holder, where FIG. 14 (*a*) is a plan view, and FIG. 14 (*b*) is a side view;

DESCRIPTION OF THE PREFERRED EMBODIMENTS

Figure 3:
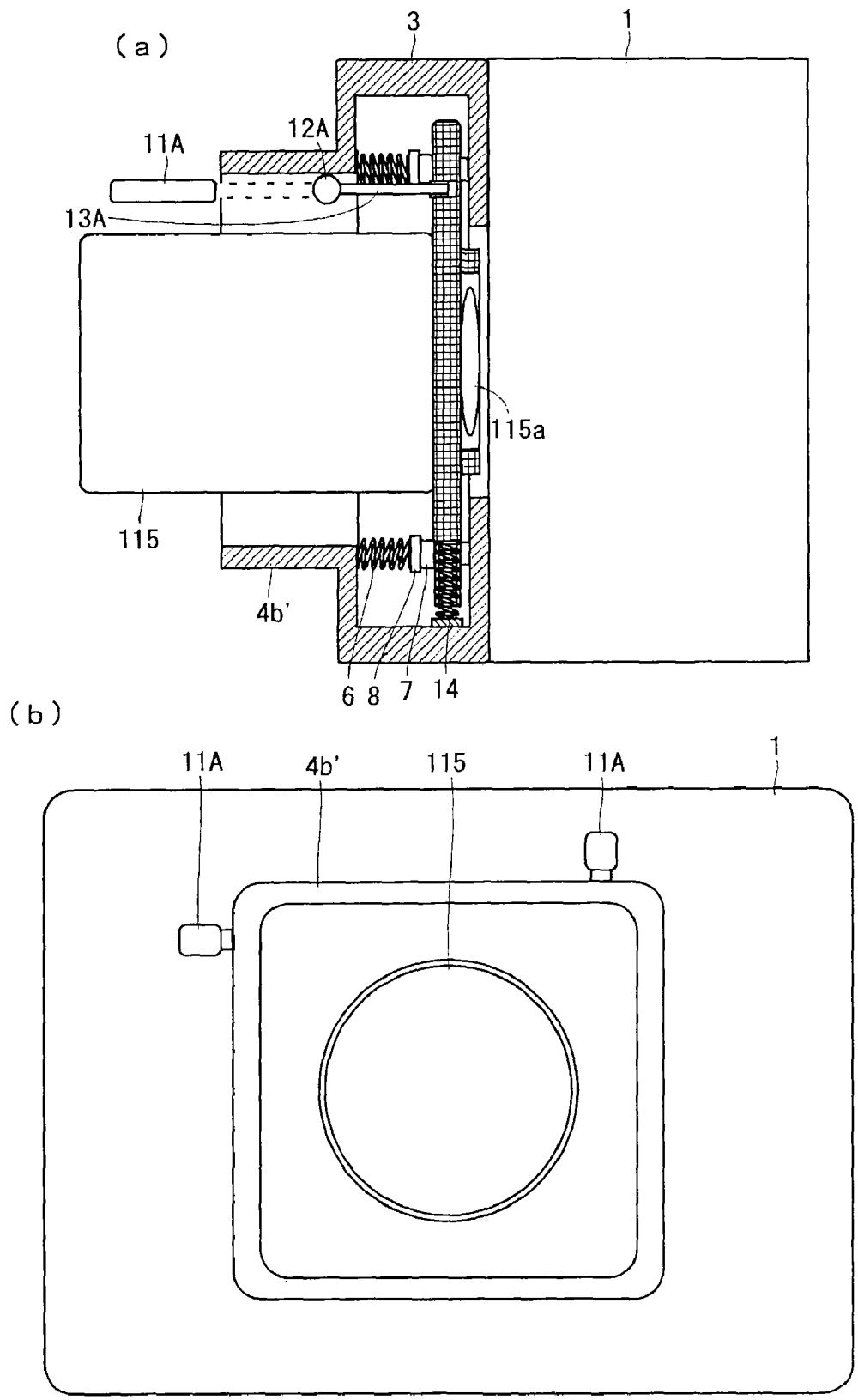
FIG. 3 is a diagram showing a lens shift mechanism of a lever operation type according to the present invention, where FIG. 3 (*a*) is a vertical sectional view, and FIG. 3 (*b*) is a front view.

A lens shift mechanism and a projection type video display according to the present invention will be described on the basis of FIGS. 1 to 17. The projection type video display described below is a liquid crystal projector using three transmission type liquid crystal display panels, and its image production optical system is the same as the liquid crystal projector shown in FIG. 18 used in the description of the prior art (in FIG. 1, for example, modulated light beams (image light beams in respective colors) which have been respectively modulated by passing through liquid crystal light valves 111, 112, and 113 are synthesized by a dichroic prism 114, to be color image light, the color image light being projected in enlarged fashion by a projection lens unit 115 and projected on a screen) and hence, the description of the optical system is not repeated, and the lens shift mechanism will be mainly described.

Embodiment 1

FIG. 1 is a diagram showing a lens shift mechanism of such a type that a projection lens unit 115 is directly moved, where FIG. 1 (*a*) is a cross-sectional view, and FIG. 1 (*b*) is a front view. The projection lens unit 115 is mounted on a mounting surface of a lens mounting plate 2, and a plurality of (e.g., four) sliding bosses 2*a* are formed on a surface opposite to the mounting surface. The sliding bosses 2*a* are not limited to an integrally formed product. For example, they may be separate products. In this case, in order to smoothly slide the projection lens unit 115, it is desirable that the sliding boss 2*a* is formed using polyacetal (POM), polyamide (PA), polytetrafluoroethylene (PTFE), or the like. Although a rear lens 115*a* is fixed by the lens mounting plate 2, the present invention is not limited to the same. For example, it may be fixed by the projection lens unit 115.

A flat box-shaped sliding base 3 is fixed to a case 1 of the projection type video display. Respective rear ends of the lens mounting plate 2 and the projection lens unit 115 are accommodated in the sliding base 3, and the sliding bosses 2a on the lens mounting plate 2 are brought into contact with an inner bottom surface of the sliding base 3. A cover 4 is mounted by screws 5 on the side of an opened end of the sliding base 3.

A plurality of (e.g., four) spring supporting bosses 4a are formed on a reverse surface of the cover 4. A coiled spring 6 is externally fitted in each of the spring supporting bosses 4a. A seat 8 for supporting and urging a sliding contact member 7 upon receipt of the urging of the coiled spring 6 is provided at a front end of the spring supporting boss 4a. A shaft portion in the seat 8 is fitted so as to be movable in a supporting hole formed at a front end of the boss 4a. When the cover 4 is mounted on the sliding base 3 by the screw 5, the coiled spring 6 enters a compressed state, so that the sliding contact member 7 is pressed against the lens mounting plate 2. Consequently, the lens mounting plate 2 is pressed against the sliding base 3. That is, the lens mounting plate 2 is interposed between the sliding base 3 and the sliding contact member 7, to be elastically supported and pressed against the sliding base 3. A pressing force at this time is set such that the position of the lens mounting plate 2 (the projection lens unit 115) can be held and shifted. That is, the pressing force is set such that the projection lens unit 115 is moved if a user applies a force for movement to the projection lens unit 115, while the position of the projection lens unit 115 is held, if the application of the force is stopped, at a position where the application of the force is stopped.

A pipe-shaped projection 4b in the shape of a circular cylinder is formed so as to surround the projection lens unit 115 at the center on a surface of the cover 4. A clearance corresponding to the shifting width of the projection lens unit 115 is ensured between an inner surface of the pipe-shaped projection 4b and the projection lens unit 115.

In the above-mentioned lens shift mechanism, the user can shift the projection lens unit 115 to desired positions in up-and-down and right-and-left directions with his or her fingers laid on the pipe-shaped projection 4b and the projection lens unit 115. Further, the user can thus shift the position of the projection lens unit 115 with his or her finger laid on the pipe-shaped projection 4b. Accordingly, the projection type video display itself is not moved.

Embodiment 2

FIGS. 2 and 3 are diagrams showing a lens shift mechanism of a lever operation type, where FIG. 2 (a) is a horizontal sectional view, FIG. 2 (b) is an enlarged view taken along an arrow A shown in FIG. 2 (a), FIG. 3 (a) is a vertical sectional view, and FIG. 3 (b) is a front view. Although the lens shift mechanism is the same as the above-mentioned lens shift mechanism in that a cover is mounted on a sliding base by a screw, the illustration of the details thereof is omitted.

The lens shift mechanism is so configured that a sliding contact member 7 is pressed against a lens mounting plate 2A through a seat 8 by a coiled spring 6, to press the lens mounting plate 2A against a sliding base 3, similarly to the above-mentioned lens shift mechanism. A pressing force at this time is set such that the position of the lens mounting plate 2A (a projection lens unit 115) can be held and shifted.

A pipe-shaped projection 4b' in the shape of a square cylinder is formed so as to surround the projection lens unit 115. The size of the pipe-shaped projection 4b' is determined in consideration of the shifting width of the projection lens unit 115 and the arrangement of a rotating shaft 12A, as described later. The rotating shaft 12A is provided at an edge of the pipe-shaped projection 4b' so as to avoid the projection lens unit 115. There are provided two sets of rotating shafts 12A in order to move the projection lens unit 115 up and down and right and left.

The rotating shaft 12A has a length corresponding to the height (or the width) of the pipe-shaped projection 4b' and is rotated by fitting and supporting its one end and the other end in a hole formed in the pipe-shaped projection 4b'. The one end or the other end of the rotating shaft 12A sticks out of the hole of the pipe-shaped projection 4b', and a lever 11A is attached to the one end or the other end of the rotating shaft 12A. The user can rotate the rotating shaft 12A by operating the lever 11A. Further, the rotating shaft 12A is provided with two operating parts 13A sticking out in a direction perpendicular to its axial direction. The operating parts 13A are engaged with a concave area formed in the lens mounting plate 2A. The position of the lens mounting plate 2A (the projection lens unit 115) can be shifted by operating the lever 11A. In the present embodiment, the projection lens unit 115 is moved up and down and right and left, as previously described. Therefore, the concave area engaged with the operating part 13A has a width corresponding to the thickness of the operating part 13A in the movement direction of the operating part 13A (see FIG. 3 (a)), while having a width corresponding to the shifting width of the lens mounting plate 2A in a direction perpendicular thereto (see FIG. 2 (a)).

Furthermore, there is provided a coiled spring 14 for urging the lens mounting plate 2A opposite to the direction of the own weight of the projection lens unit 115 (see FIG. 3 (a)). One end of the coiled spring 14 is brought into contact with a lower end surface of the lens mounting plate 2A, and the other end thereof is brought into contact with an inner surface of the sliding base 3. As shown in FIG. 2 (b), a spring 15 is mounted in a hole formed on a lower surface of the lever 11A, and a click ball 16 is urged by the spring 15. A concave area 4b' 1 in which the click ball 16 is lightly fitted is formed on a surface of the pipe-shaped projection 4b' in close proximity to the lower surface of the lever 11A. The concave area 4b'1 is formed in a portion where the projection lens unit 115 can assume its optimum projection position. The same effect is obtained even by replacing the spring 15 with a leaf spring and pressing a convex area on the leaf spring.

In such a lens shift mechanism of a lever operation type, the projection lens unit 115 can be shifted by operating the lever 11A, so that the shifting operation is easy. Further, the shifting direction is determined to be a direction perpendicular to the rotating shaft 12A, thereby making it possible to enhance the movement linearity of the projection lens unit 115. Further, the rotating shaft 12A is provided at a position where an extension of its axis does not cross the projection lens unit 115, so that the length thereof can be increased. Consequently, a point of action by the operating part 13A can be positioned on the center line in the movement direction of the lens mounting plate 2A, and an offset can be eliminated in application of a force for moving the lens mounting plate 2A. Accordingly, in moving the projection lens unit 115 straight, the accuracy thereof is further improved.

Furthermore, the coiled spring 14 is provided, thereby making it possible to prevent the position of the projection lens unit 115 from being slipped off by its own weight and to smooth the shifting operation. When the click ball 16 in the lever 11A is locked in the concave area 4b'1, the projection lens unit 115 is positioned at its optimum projection position. The user can confirm this state with a click impression in a case where the click ball 16 is locked in the concave area 4b'1.

If the length of the lever 11A is set to two times, for example, that of the operating part 13A, a force for moving the projection lens unit 115 is halved, for example, and is suitable for movement by fine adjustment of the projection lens unit 115. Further, the lever 11A, the rotating shaft 12A, and the operating part 13A may be integrally formed, or may be formed as separate members.

Embodiment 3

FIG. 4 is a diagram showing another example of a lens shift mechanism of a lever operation type, where FIG. 4 (*a*) is a sectional view, and FIG. 4 (*b*) is a front view.

The lens shift mechanism is so configured that a sliding contact member 7 is pressed against a lens mounting plate 2B through a seat 8 by a coiled spring 6, thereby pressing the lens mounting plate 2B against a sliding base 3, similarly to the above-mentioned lens shift mechanism. A pressing force at this time is set such that the position of the lens mounting plate 2B (a projection lens unit 115) is held and shifted.

A pipe-shaped projection 4b' in the shape of a square cylinder is formed so as to surround the projection lens unit 115. The size of the pipe-shaped projection 4b' is determined in consideration of the shifting width of the projection lens unit 115 and the arrangement of a rotating shaft 12B. The rotating shaft 12B is provided at the center of an edge of the pipe-shaped projection 4b' such that an extension of its axis crosses the projection lens unit 115. There are provided two sets of rotating shafts 12B in order to move the projection lens unit 115 up and down and right and left.

The rotating shaft 12B is made as short as possible, and is provided in a fixed state on an inner surface of the pipe-shaped projection 4b'. A lever 11B and an operating part 13B which are integrated are supported on the rotating shaft 12B so as to be rotatable. The lens shift mechanism may be so configured that the rotating shaft 12B is provided so as to be rotatable with respect to the pipe-shaped projection 4b', and the lever 11B and the operating part 13B are fixed to the rotating shaft 12B. The operating part 13B is engaged with a concave area formed in the lens mounting plate 2B. The position of the lens mounting plate 2B (the projection lens unit 115) can be shifted by operating the lever 11B.

In such a configuration, the lever 11B can be arranged close to the position of the projection lens unit 115, so that an apparent compact impression of the lens shift mechanism is improved, thereby an appearance can be made better. Two operating parts 13B may be formed with respect to the one lever 11B. In this case, the movement stability of the lens mounting plate 2B can be enhanced.

Figure 5:
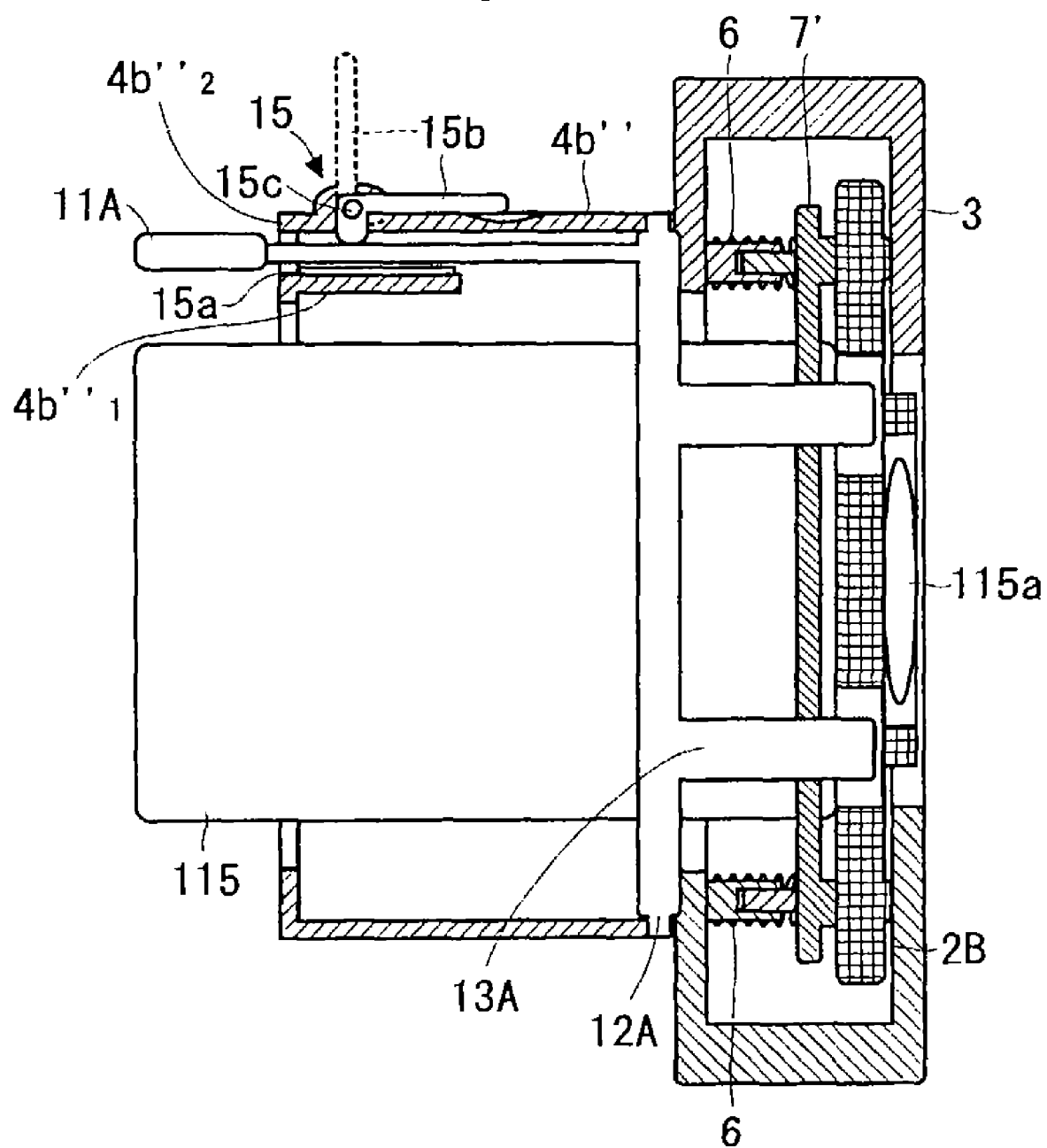
FIG. 5 is a vertical sectional view showing a lens shift mechanism with a stopper of a lever operation type according to the present invention.

FIGS. 5 to 7 illustrate a configuration comprising a stopper mechanism 15 in the lens shift mechanism having the same configuration as that of the lens shift mechanism of the lever operation type shown in FIGS. 2 and 3. In the example shown in FIG. 5, a stick-shaped (or frame-shaped) sliding contact member 7' is used. The stopper mechanism 15 is formed on a pipe-shaped projection 4b''. The pipe-shaped projection 4b'' in a portion where the stopper mechanism 15 is formed comprises an inner frame portion 4b'1 and an outer frame portion 4b''2, and a lever 1A sticks out of a frame through a clearance therebetween. A friction plate 15a composed of rubber, for example, is provided on the inner frame portion 4b''1. A stopper lever 15b is provided so as to be rotatable by a shaft 15c in the outer frame portion 4b''2. The stopper lever 15b is formed an approximately L shape comprising an operating part operated by a user and a functioning part exerted on the lever 11A. The functioning part presses the lever 11A against the friction plate 15a in a state where the operating part is laid (a state where it is arranged approximately parallel to the outer frame portion 4b''2) (see FIG. 7 (*b*)), while not pressing the lever 11A against the friction plate 15a in a state where the operating part is raised (see FIG. 7 (*a*)). A circular arc-shaped concave area is formed in a portion of the outer frame portion 4b''2 corresponding to the head of the operating part in a state where the operating part is laid, thereby making it easy for the user to pick up the tip of his or her finger in the head of the operating part.

The stopper mechanism 15 is thus provided, thereby making it possible to prevent the position of the projection lens unit 115 from being slipped off even in a case where the projection type video display is moved or a case where the user touches the lever 11A with his or her hand through carelessness. The stopper mechanism 15 frictionally locks the lever 11A. Therefore, the configuration of the lens shift mechanism can be more easily simplified, as compared with that in a case where a mechanism for preventing the rotating shaft 12A from being rotated is taken as a stopper mechanism.

FIG. 8 illustrates another example of a stopper mechanism. In the stopper mechanism shown in FIG. 8, the lever 11A is pressed against the friction plate 15a. The lever 11A cannot be moved in this state. Considered as a method of pressing the lever 11A against the friction plate 15a are a method utilizing the elasticity of the lever 11A and a method of pressing the lever 11A against the friction plate 15a using another elastic mechanism, for example. A user can rotate the lever 11A by lifting the lever 11A off the friction plate 15a against an elastic force. The stopper mechanism is also applicable in the lens shift mechanism of the type shown in FIG. 4.

Embodiment 4

Figure 9:
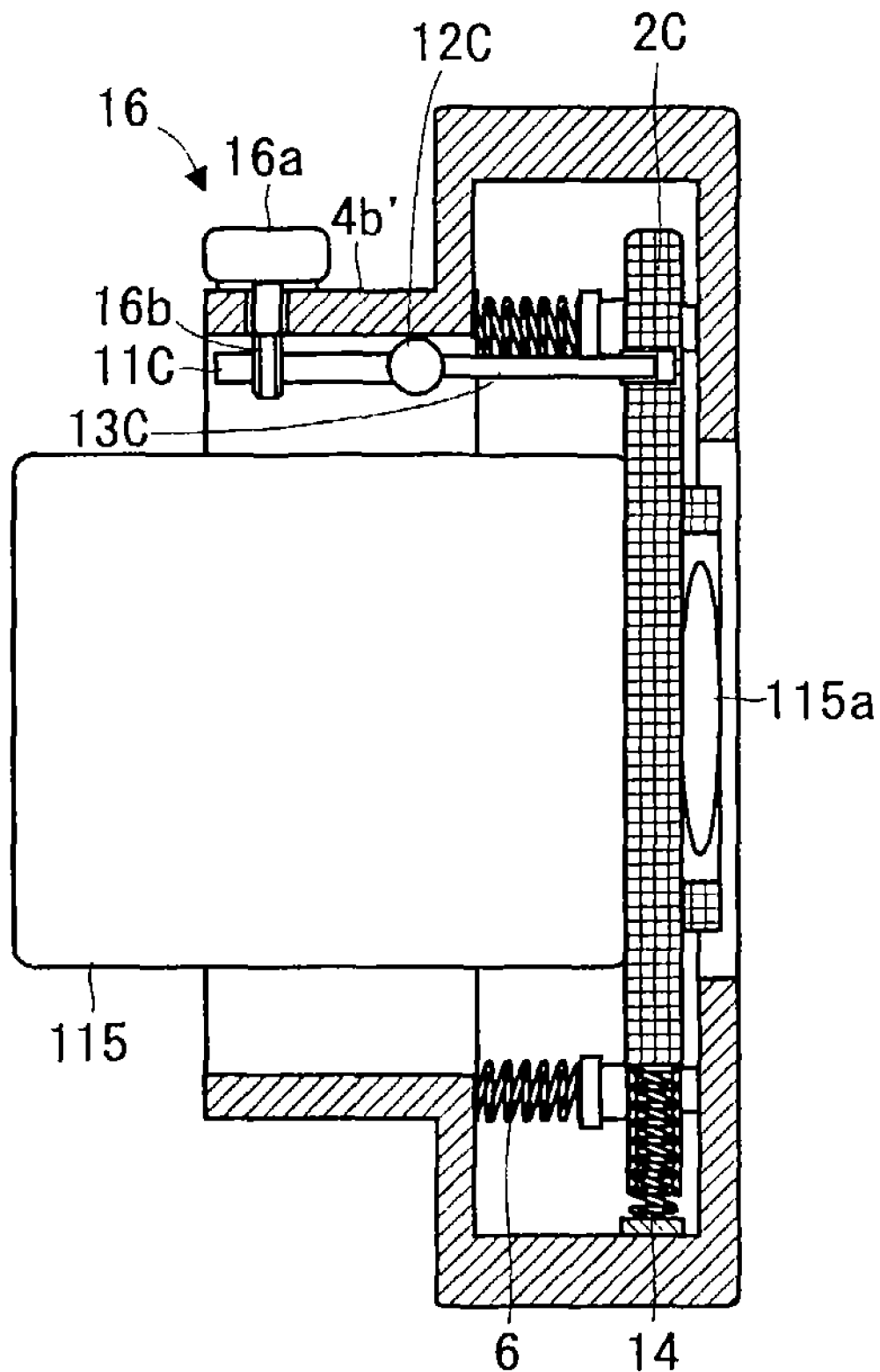
FIG. 9 is a vertical sectional view showing a lens shift mechanism of such a type that a lever is driven by a screw mechanism according to the present invention.

FIG. 9 is a cross-sectional view showing a lens shift mechanism of such a type that a lever is driven by a screw mechanism 16. The screw mechanism 16 is provided so as to be rotatable in a pipe-shaped projection 4b', and cannot be moved along its axis. The screw mechanism 16 comprises a knob 16a positioned outside the pipe-shaped projection 4b' and a shaft 16b locked in the pipe-shaped projection 4b' and having a screw at its front end. The screw at the front end of the shaft 16b is positioned inside the pipe-shaped projection 4b', and is screwed into a screw hole formed in a lever 11C. A rotating shaft 12C has a length corresponding to the height of the pipe-shaped projection 4b', and is rotated by fitting and supporting its one end and the other end in a hole formed in the pipe-shaped projection 4b'. Further, the rotating shaft 12C is provided with an operating part 13C sticking out in a direction perpendicular to its axial direction. The operating part 13C is engaged with a concave area formed in the lens mounting plate 2C. The lever 11C is driven by turning the knob 16a in the screw mechanism 16, so that the position of the lens mounting plate 2C (the projection lens unit 115) is shifted. Further, the lever 11C is screwed into the screw mechanism 16, so that the lever 11c itself has the function of fixing the lever 11C at its arbitrary position.

In the above-mentioned example, the lens shift mechanism is so configured that the screw mechanism 16 is operated by a user, it may be so configured that the screw mechanism 16 is driven by an actuator such as a motor.

Embodiment 5

FIG. 10 is a diagram showing a lens shift mechanism of such a type that a projection lens unit 115 is directly moved, where FIG. 10 (a) is a cross-sectional view, and FIG. 10 (b) is a front view. Although the configuration of the lens shift mechanism is the same as that of the lens shift mechanism shown in FIG. 1, a pipe-shaped projection 41 is not fixed to but screwed into a cover 4. The pipe-shaped projection 41 is screwed into the cover 4 so that a lens mounting plate 2 is pressed against a sliding base 3 by the pipe-shaped projection 41. Accordingly, the lens mounting plate 2 becomes immovable. That is, in such a type that the projection lens unit 115 is directly moved, the pipe-shaped projection 41 is caused to have a stopper mechanism. Although the innermost end of the pipe-shaped projection 41 may be directly pressed against the lens mounting plate 2, a plate 17 is interposed between the innermost end of the pipe-shaped projection 41 and the lens mounting plate 2 in the configuration shown in FIG. 10.

Although in the above-mentioned embodiment, the coiled spring 8 is illustrated as means for urging the lens mounting plate 2 toward the sliding base 3, the coiled spring 8 may be replaced with another spring such as a leaf spring. Alternatively, an elastic member such as rubber may be used without being limited to the spring. Although the cover 4 is provided with a spring supporting boss 4a, a coiled spring 6, a sliding contact member 7, and so on, they may be provided on the side of the lens mounting plate 2 so that a reverse surface of the cover 4 serves as a sliding contact surface. Although the image production optical system using three transmission type liquid crystal display panels is illustrated, the present invention is not limited to such an image production optical system. The present invention is also applicable to a case where another image production optical system is used.

As described in the foregoing, according to the present invention, the guide shaft, the sliding bearing, the screw shaft, and so on in the lens shift mechanism having the conventional configuration are not required. Even when the projection lens unit is shifted up and down and right and left, therefore, the configuration of the lens shift mechanism is not complicated. If the pipe-shaped projection is provided, the user can shift the position of the projection lens unit with his or her fingers laid on the pipe-shaped projection and the projection lens unit, thereby making it possible to prevent the projection type video display itself from being moved. If the projection lens unit can be shifted by operating the lever, the shifting operation becomes easy. Further, the shifting direction is a direction perpendicular to a rotating shaft of a rotating member, thereby making it possible to improve the movement linearity of the projection lens unit.

If the lens shift mechanism comprises stopper means for fixing a member related to the shifting operation of the lens mounting plate, the position of the projection lens unit can be prevented from being slipped off even in cases such as a case where the projection type video display is moved and a case where the user touches the lever with his or her hand through carelessness. Further, the configuration of the lens shift mechanism using a stopper structure for frictionally locking the lever itself can be more easily simplified, as compared with that in a case where a mechanism for preventing a rotating member from being rotated, for example, is taken as stopper means.

If the rotating member is provided at a position where an extension of its rotating shaft does not cross the projection lens unit, used as the rotating member can be a long one. Consequently, a point of action by the operating part can be positioned on the center line in the movement direction of the lens mounting plate, and an offset can be eliminated in application of a force for moving the lens mounting plate. In moving the projection lens unit straight, the accuracy thereof can be further improved. On the other hand, if the rotating member is provided at a position where an extension of its rotating shaft crosses the projection lens unit, the lever can be arranged close to the position of the projection lens unit, so that an apparent compact impression of the lens shift mechanism is improved, thereby making it possible to enhance design properties. If urging means for urging the lens mounting plate is provided opposite to the direction of the own weight of the projection lens unit, the effect of achieving an operation for smoothly shifting the projection lens unit is produced.

Embodiment 6

Figure 11:
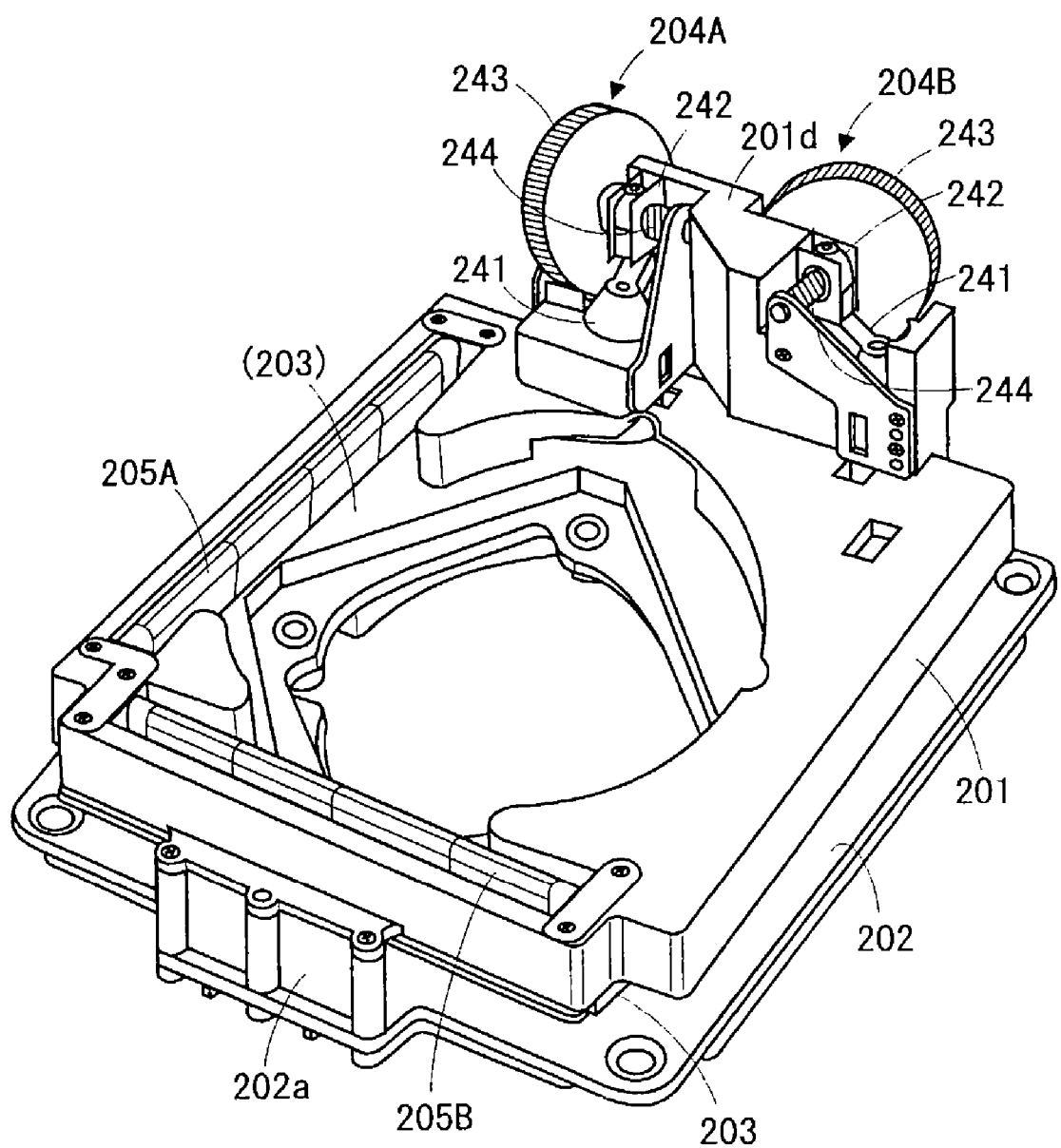
FIG. 11 is a perspective view showing a lens shift mechanism according to the present invention.

FIG. 11 is a perspective view showing a lens shift mechanism according to an embodiment 6. The lens shift mechanism comprises a first stationary plate member 201, a second stationary plate member 202, a lens holder 203, driving mechanisms 204A and 204B, and guiding members 205A and 205B. The second stationary plate member 202 is fixed to a chassis in a liquid crystal projector. A lens unit (not shown) is fixed to the lens holder 203.

FIG. 12 is a diagram showing the first stationary plate member 201, where FIG. 12 (a) is a plan view, and FIG. 12 (b) is a side view. A circular through hole at the center is a through hole 201a for a lens unit (not shown), and a square through hole 201b on the right side and a square through hole 201c on the lower side which connect with the through hole 201a are respectively mounting holes for the guiding members 205A and 205B. A standing portion 201d is provided with two circular holes 201e in a direction perpendicular to paper in FIG. 12 (a) (parallel to the direction of an optical axis of the lens unit), and a rotating member 241 is inserted so as to be rotatable into each of the circular holes 201e. Holes 201f are formed on a lower surface of the first stationary plate member 201, and a sliding contact member 211 is inserted into each of the holes 201f. The sliding contact member 211 is formed using polyacetal (POM), polyamide (PA), polytetrafluoroethylene (PTFE), or the like. Each of the holes 201f is provided with a coiled spring 212. The sliding contact member 211 presses the lens holder 203 against the second stationary plate member 202 by the coiled spring 212. A pressing force at this time is set such that the position of the lens holder 203 (the lens unit) can be held and shifted. That is, the pressing force is set such that the lens holder 203 is moved if a force for movement is applied to the lens holder 203, while the position of the lens holder 203 is held, if the application of the force is stopped, at a position where the application of the force is stopped.

FIG. 13 is a diagram showing the second stationary plate member 202, where FIG. 13 (a) is a plan view, and FIG. 13 (b) is a side view. Standing portions 202a are formed at two edges of the second stationary plate member 202. The first stationary plate member 201 is placed on the standing portion 202a and is screwed thereinto, so that the first stationary plate member 201 and the second stationary plate member 202 are fixed to each other, a space is formed therebetween, and the lens holder 203 can be positioned in the space. Sliding contact convex areas 202b are formed in the second stationary plate member 202, and the lens holder 203 is placed on the sliding contact convex areas 202b.

FIG. 14 is a diagram showing the lens holder 203, where FIG. 14 (a) is a plan view, and FIG. 14 (b) is a side view. A through hole 203a at the center is a light introducing hole for a lens unit (not shown). In FIG. 14 (a), a recess 203b extending in the crosswise direction is a hole with which a projection 241a in a rotating member 241 for moving the lens holder 203 up and down (see FIGS. 15 and 16) is engaged, and a recess 203c extending in the lengthwise direction is a hole with which the projection 241a in the rotating member 241 for moving the lens holder 203 right and left is engaged. The recesses 203b and 203c may be provided with members for reducing friction. Cut portions 203d and cut portions 203e are in a concave shape by mounting L-shaped metal fittings (not shown) thereon, and respective guide projections 251 in the guiding members 205A and 205B are engaged therewith.

Figure 15:
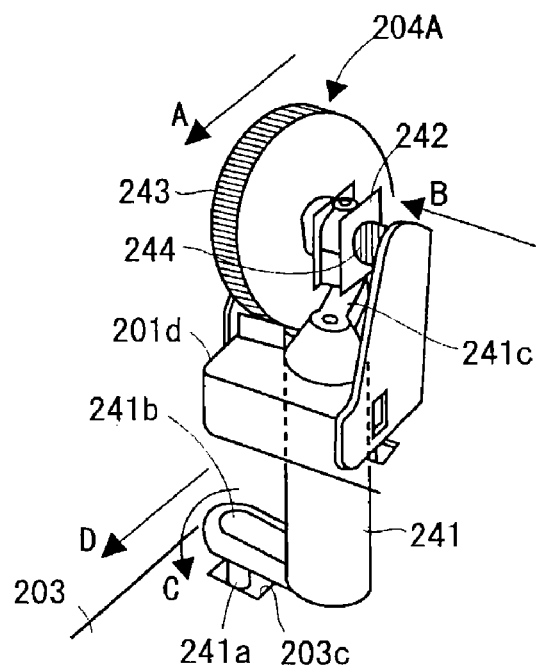
FIG. 15 is a perspective view showing a state where a projection and a recess of a rotating member are engaged with each other in a driving mechanism.
Figure 16:
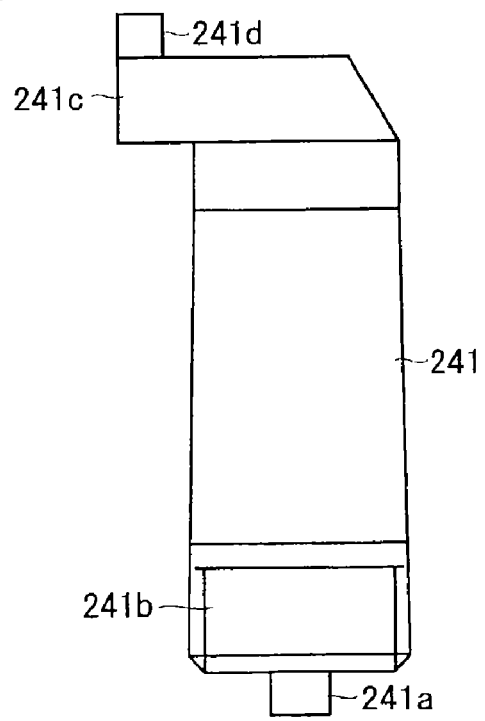
FIG. 16 is a side view of a rotating member.

FIG. 15 is a perspective view showing a state where the projection 241a in the rotating member 241 and the recess 203c are engaged with each other in the driving mechanism 204A, and FIG. 16 is a side view of the rotating member 241. A projection 241b sticking out sideward is formed at the bottom of the rotating member 241. The above-mentioned projection 241a is formed on a lower surface at a front end of the projection 241b. That is, the projection 241a exists eccentrically from a rotation center of the rotating member 241. Further, a projection 241c sticking out sideward is formed at the top of the rotating member 241. The direction in which the projection 241c sticks out is shifted 90° away from the direction in which the projection 241b sticks out. A projection 241d is formed on an upper surface at a front end of the projection 241c. That is, the projection 241d also exists eccentrically from the rotation center of the rotating member 241. The projection 241d is engaged in a hole formed on a lower surface of a moving member 242.

The moving member 242 is screwed into a screw 244 fixed to a dial 243. The dial 243 and the screw 244 are provided with the rotation thereof allowed and the axial movement thereof regulated. In FIG. 15, when the dial 243 is operated in a direction A, the moving member 242 is moved in a direction B. When the moving member 242 is moved in the direction B, the rotating member 241 is rotated in a direction C. The projection 241a presses the lens holder 203 in a direction D by the rotation in the direction C of the rotating member 241. That is, when the dial 243 is rotated in the direction A, the lens holder 203 (the lens unit) is moved in the direction D which is the same direction as the direction A. Although the driving mechanism 204B is composed of the same mechanism as the driving mechanism 204A, as also illustrated in FIG. 17 (a), the arrangement thereof is shifted 90° away from the driving mechanism 204A.

Figure 17:
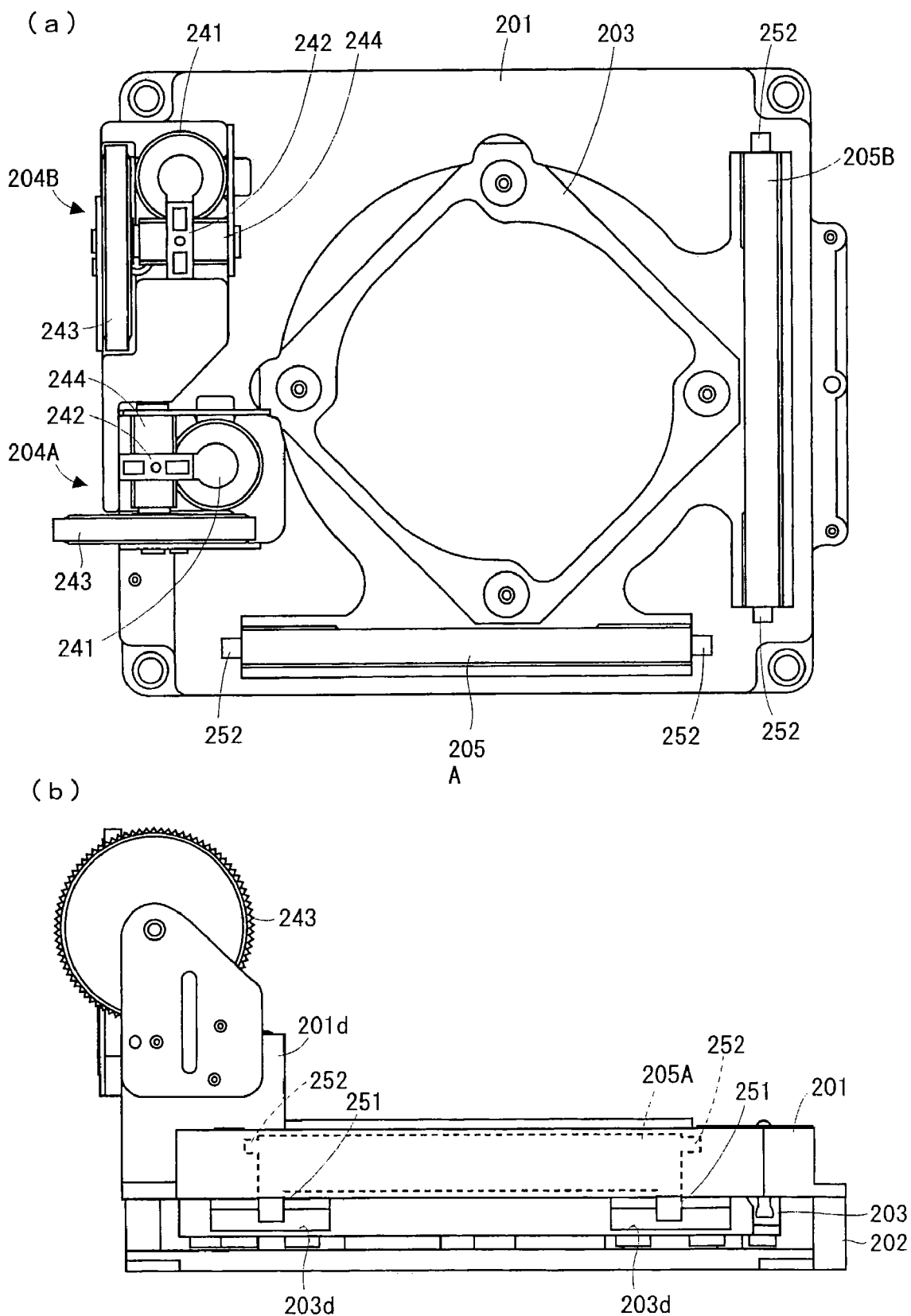
FIG. 17 (*a*) is a plan view of a lens shift mechanism, and FIG. 17 (*b*) is a side view thereof.
Figure 18:
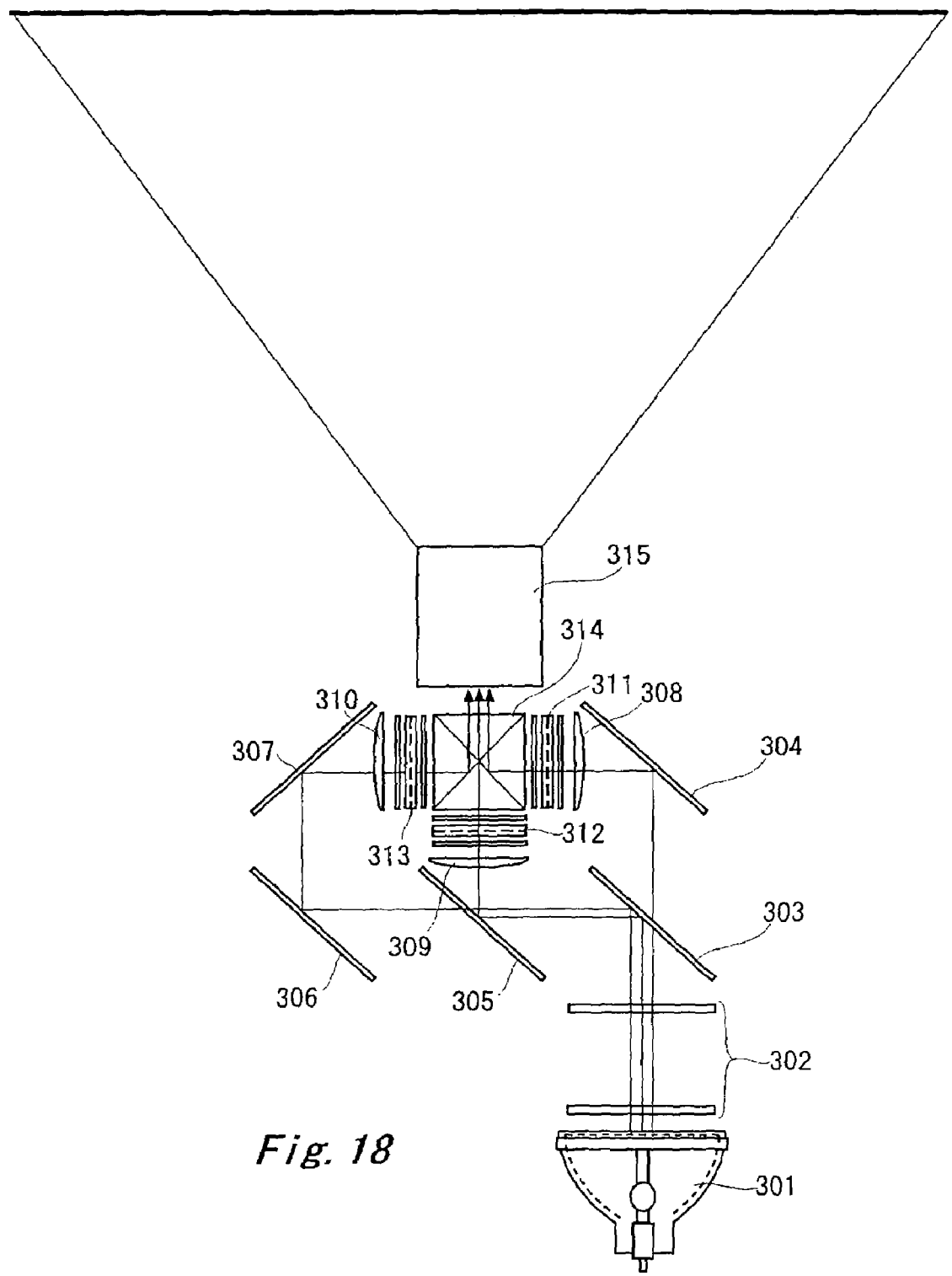
FIG. 18 is a diagram illustrating an example of an optical system in a three-plate color liquid crystal projector.
Figure 19:
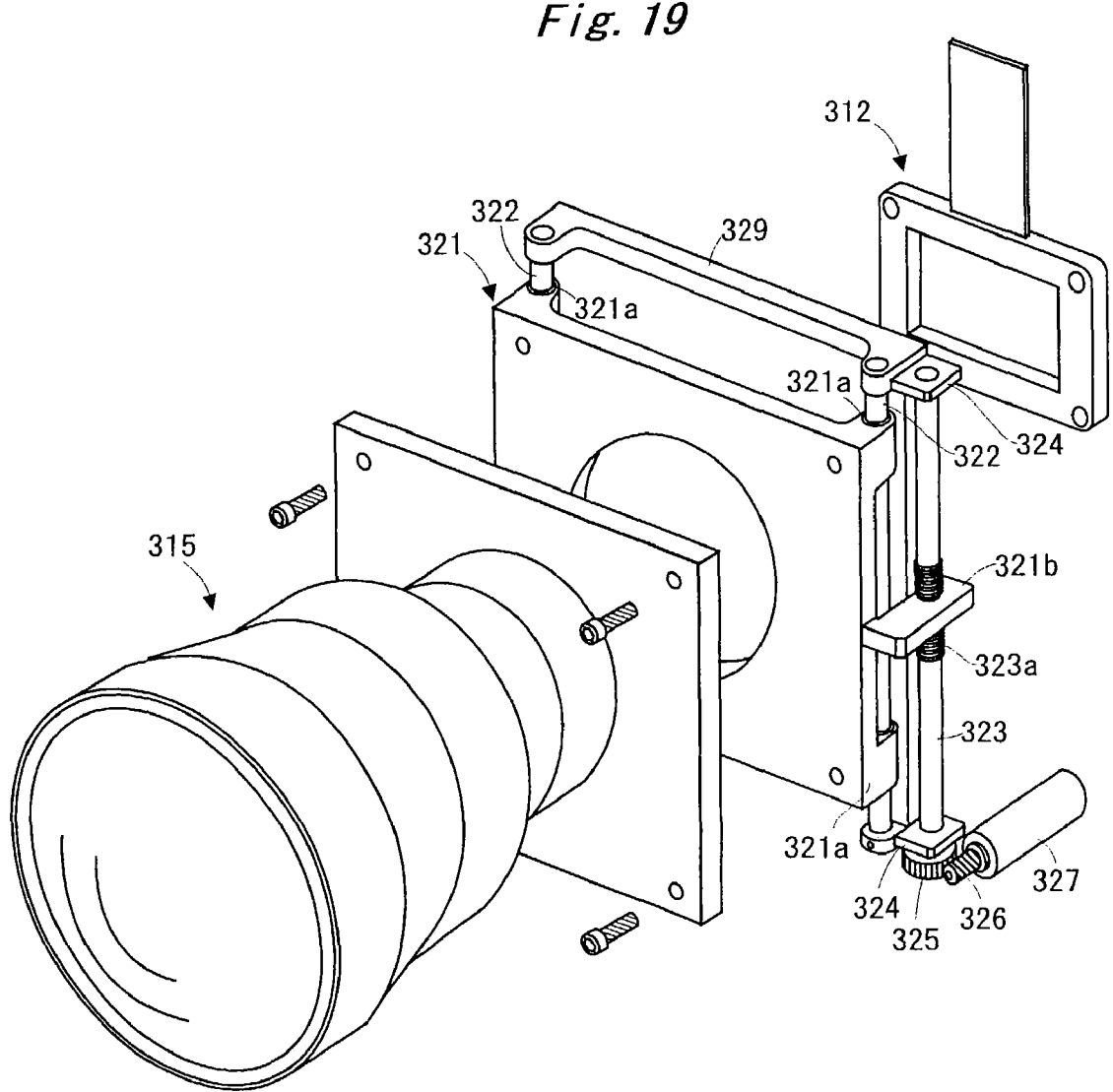
FIG. 19 is a perspective view showing a lens shift mechanism for moving the projection lens unit up and down.

As shown in FIG. 17 (b), the guiding member 205A has guide projections 251 on the lower side at both ends along its length. Further, the guiding member 205A has shafts 252 on the upper side at both ends along its length, and the axial direction thereof coincides with the shifting direction (vertical direction) of the lens holder 203. The guiding member 205B has guide projections 251 on the lower side at both ends along its length and shafts 252 on the upper side at both ends along its length, and the axial direction thereof coincides with the shifting direction (horizontal direction) of the lens holder 203.

The guiding member 205A ensures movement linearity in a case where the dial 243 on the driving mechanism 204A is operated so that the lens holder 203 is moved, and swings around the shaft 252 when the dial 243 in the driving mechanism 204B is operated so that the lens holder 203 is moved, to follow the lens holder 203 and maintain the engaged state with the lens holder 203. Further, the guiding member 205B ensures movement linearity in a case where the dial 243 in the driving mechanism 204B is operated so that the lens holder 203 is moved, and swings around the shaft 252 when the dial 243 in the driving mechanism 204A is operated so that the lens holder 203 is moved, to follow the lens holder 203 and maintain the engaged state with the lens holder 203.

Although in the above-mentioned embodiments, the coiled spring 212 is used as means for pressing the lens holder 203 against the second stationary plate member 202, the coiled spring 212 may be replaced with another spring such as a leaf spring. Alternatively, an elastic member such as rubber may be used without being limited to the spring. Besides pressing the lens holder 203 against the second stationary plate member 202, it is also possible to press the lens holder 203 against the first stationary plate member 201. Further, it is also possible to fix a gear to an upper end of the rotating member 241 in place of the moving member 242, to employ a worm gear mechanical structure. Although the image production optical system using three transmission type liquid crystal display panels is illustrated, the present invention is not limited to such an image production optical system. For example, the present invention is also applicable to a case where another image production optical system is used.

As described in the foregoing, according to the present invention, the guide shaft, the sliding bearing, and so on in the lens shift mechanism having the conventional configuration are not required. Even when the position of the projection lens unit is shifted up and down and right and left, the configuration is not complicated. Moreover, a rightward operating force may be applied to the dial if it is desired to shift the projection lens unit rightward, while an upward operating force may be applied to the dial if it is desired to shift the projection lens unit upward, thereby producing such an effect that a user can perform a lens shifting operation without having an uncomfortable feeling.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A lens shift mechanism for shifting a projection lens unit for projecting an image in a direction perpendicular to its optical axis, the lens shift mechanism comprising:
   a lens mounting member to which said projection lens unit is fixed;
   a contact member with which said lens mounting member is brought into contact; and
   a pressing mechanism for pressing said lens mounting member against said contact member with a pressing force that can hold the position of said projection lens unit and allow shifting of the position of the projection lens unit, the pressing mechanism including a coiled spring and a sliding contact member that is pressed against the lens mounting member by a pressing force of the coiled spring, wherein the lens mounting member is interposed between the contact member and the sliding contact member of the pressing mechanism and in contact with the contact member and the sliding contact member of the pressing mechanism such that the lens mounting member slides against surfaces of both the contact member and the sliding contact member of the pressing mechanism when the projection lens unit is shifted.

2. The lens shift mechanism according to claim 1, wherein a pipe-shaped projection is provided so as to surround the projection lens unit, and
there is a clearance corresponding to the shifting width of the projection lens unit between the pipe-shaped projection and the projection lens unit.

3. The lens shift mechanism according to claim 1, wherein there is provided a rotating member to which a lever operated by a user is attached,
an operating part is formed in the rotating member,
the operating part is engaged with the lens mounting member, and
the position of the projection lens unit is shifted by operating said lever.

4. The lens shift mechanism according to claim 3, wherein there is provided stopper means for fixing a member related to the shifting operation of said lens mounting member.

5. The lens shift mechanism according to claim 4, wherein said lever is provided, spaced apart from a friction member, and
the user operates a movable member so that the movable member can press the lever against the friction member to fix the lever.

6. The lens shift mechanism according to claim 4, wherein said lever is provided in contact with the friction member, and
the user can rotate the lever by lifting said lever off the friction member.

7. The lens shift mechanism according to claim 3, wherein a concave area or a convex area is formed on a surface of a member in contact with or in close proximity to a surface of said lever, and
said lever is lightly locked in said concave area or said convex area to such an extent that the rotation thereof is not prevented.

8. The lens shift mechanism according to claim 3, wherein said rotating member is provided at a position where an extension of its rotating shaft does not cross the projection lens unit.

9. The lens shift mechanism according to claim 3, wherein said rotating member is provided at a position where an extension of its rotating shaft crosses the projection lens unit.

10. The lens shift mechanism according to claim 3, wherein
urging means for urging the lens mounting member is provided opposite to the direction of the own weight of the projection lens unit.

11. The lens shift mechanism according to claim 1, wherein
there is provided a rotating member to which a lever is attached,
an operating part is formed in the rotating member,
the operating part is engaged with the lens mounting member,
said lever is connected to a lever driving screw mechanism, and
said lever is rotated by the lever driving screw mechanism so that the position of the projection lens unit can be shifted.

12. The lens shift mechanism according to claim 11, wherein
said lever driving screw mechanism is operated by the user.

13. The lens shift mechanism according to claim 11, wherein
said lever driving screw mechanism is driven by an actuator.

14. The lens shift mechanism according to claim 11, wherein
a concave area or a convex area is formed on a surface of a member in contact with or in close proximity to a surface of said lever, and
said lever is lightly locked in said concave area or said convex area to such an extent that the rotation thereof is not prevented.

15. The lens shift mechanism according to claim 11, wherein
said rotating member is provided at a position where an extension of its rotating shaft does not cross the projection lens unit.

16. The lens shift mechanism according to claim 11, wherein
said rotating member is provided at a position where an extension of its rotating shaft crosses the projection lens unit.

17. The lens shift mechanism according to claim 11, wherein
urging means for urging the lens mounting member is provided opposite to the direction of the own weight of the projection lens unit.

18. The lens shift mechanism according to claim 1, wherein
urging means for urging the lens mounting member is provided opposite to the direction of the own weight of the projection lens unit.

19. In a projection type video display for optically modulating light emitted from a light source in a light bulb and projecting an image in a projection lens unit, a projection type video display comprising the lens shift mechanism according to claim 1.

20. A lens shift mechanism for shifting a projection lens unit for projecting an image in a direction perpendicular to its optical axis, the lens shift mechanism comprising:
a lens mounting member to which said projection lens unit is fixed;
a contact member with which said lens mounting member is brought into contact;
a pressing mechanism for pressing said lens mounting member against said contact member and set such that the pressing force can hold and shift the position of said projection lens unit, the pressing mechanism applying a pressing force in an optical axis direction;
a dial to control shift of a position of the projection lens unit; and
a driving mechanism for moving said lens mounting member in a direction conforming to a direction in which the dial is rotated in response to rotation of the dial.

21. The lens shift mechanism according to claim 20, wherein
said driving mechanism has a rotating member having a rotation center parallel to said optical axis, said rotating member is provided with a projection at a position eccentric from the rotation center, and
the projection is engaged with said lens mounting member.

22. The lens shift mechanism according to claim 21, wherein
said dial is provided with a screw,
a moving member is screwed into said screw, and
said rotating member is rotated by the movement of said moving member.

23. The lens shift mechanism according to claim 22, wherein
there are provided two driving mechanisms such that said projection lens unit is moved up and down and right and left.

24. The lens shift mechanism according to claim 23, wherein
there are provided a first guiding member for guiding said projection lens unit up and down and a second guiding member for guiding the projection lens unit right and left,
a guide projection in each of the guiding members is engaged with a guiding hole formed in the lens mounting member,
said first guiding member has an axis in the vertical direction and is provided so as to be swingable right and left, and
said second guiding member has an axis in the horizontal direction and is provided so as to be swingable up and down.

25. The lens shift mechanism according to claim 21, wherein
there are provided two driving mechanisms such that said projection lens unit is moved up and down and right and left.

26. The lens shift mechanism according to claim 25, wherein
there are provided a first guiding member for guiding said projection lens unit up and down and a second guiding member for guiding the projection lens unit right and left,
a guide projection in each of the guiding members is engaged with a guiding hole formed in the lens mounting member,
said first guiding member has an axis in the vertical direction and is provided so as to be swingable right and left, and
said second guiding member has an axis in the horizontal direction and is provided so as to be swingable up and down.

27. The lens shift mechanism according to claim 20, wherein
there are provided two driving mechanisms such that said projection lens unit is moved up and down and right and left.

28. The lens shift mechanism according to claim 27, wherein
there are provided a first guiding member for guiding said projection lens unit up and down and a second guiding member for guiding the projection lens unit right and left,
a guide projection in each of the guiding members is engaged with a guiding hole formed in the lens mounting member,
said first guiding member has an axis in the vertical direction and is provided so as to be swingable right and left, and
said second guiding member has an axis in the horizontal direction and is provided so as to be swingable up and down.

29. In a projection type video display for optically modulating light emitted from a light source in a light bulb and projecting an image in a projection lens unit, a projection type video display comprising the lens shift mechanism according to claim 20.

30. A lens shift mechanism for shifting a projection lens unit for projecting an image in a direction perpendicular to its optical axis, the lens shift mechanism comprising:
a lens mounting member to which said projection lens unit is fixed;
a contact member with which said lens mounting member is brought into contact;
a pressing mechanism for pressing said lens mounting member against said contact member and set such that the pressing force can hold and shift the position of said projection lens unit;
a dial operated in a direction conforming to said shifting direction; and
a driving mechanism for moving said lens mounting member in the direction in which the dial is operated upon receipt of a force for operating the dial,
wherein said driving mechanism has a rotating member having a rotation center parallel to said optical axis, said rotating member is provided with a projection at a position eccentric from the rotation center, and the projection is engaged with said lens mounting member, and
wherein said dial is provided with a screw, a moving member is screwed into said screw, and said rotating member is rotated by the movement of said moving member.

31. The lens shift mechanism according to claim 30, wherein
there are provided two driving mechanisms such that said projection lens unit is moved up and down and right and left.

32. The lens shift mechanism according to claim 31, wherein
there are provided a first guiding member for guiding said projection lens unit up and down and a second guiding member for guiding the projection lens unit right and left,
a guide projection in each of the guiding members is engaged with a guiding hole formed in the lens mounting member,
said first guiding member has an axis in the vertical direction and is provided so as to be swingable right and left, and
said second guiding member has an axis in the horizontal direction and is provided so as to be swingable up and down.

33. A lens shift mechanism for shifting a projection lens unit for projecting an image in a direction perpendicular to its optical axis, the lens shift mechanism comprising:
a lens mounting member to which said projection lens unit is fixed;
a contact member with which said lens mounting member is brought into contact;
a pressing mechanism for pressing said lens mounting member against said contact member and set such that the pressing force can hold and shift the position of said projection lens unit;
a dial operated in a direction conforming to said shifting direction; and a driving mechanism for moving said lens mounting member in the direction in which the dial is operated upon receipt of a force for operating the dial, wherein said driving mechanism has a rotating member having a rotation center parallel to said optical axis, said rotating member is provided with a projection at a position eccentric from the rotation center, and the projection is engaged with said lens mounting member, and wherein there are provided two driving mechanisms such that said projection lens unit is moved up and down and right and left.

34. The lens shift mechanism according to claim 33, wherein there are provided a first guiding member for guiding said projection lens unit up and down and a second guiding member for guiding the projection lens unit right and left, a guide projection in each of the guiding members is engaged with a guiding hole formed in the lens mounting member, said first guiding member has an axis in the vertical direction and is provided so as to be swingable right and left, and said second guiding member has an axis in the horizontal direction and is provided so as to be swingable up and down.

35. A lens shift mechanism for shifting a projection lens unit for projecting an image in a direction perpendicular to its optical axis, the lens shift mechanism comprising:

a lens mounting member to which said projection lens unit is fixed;

a contact member with which said lens mounting member is brought into contact;

a pressing mechanism for pressing said lens mounting member against said contact member and set such that the pressing force can hold and shift the position of said projection lens unit;

a dial operated in a direction conforming to said shifting direction; and a driving mechanism for moving said lens mounting member in a direction the dial is operated upon receipt of a force for operating the dial, wherein there are provided two driving mechanisms such that said projection lens unit is moved up and down and right and left, there are provided a first guiding member for guiding said projection lens unit up and down and a second guiding member for guiding the projection lens unit right and left, a guide projection in each of the guiding members is engaged with a guiding hole formed in the lens mounting member, said first guiding member has an axis in the vertical direction and is provided so as to be swingable right and left, and said second guiding member has an axis in the horizontal direction and is provided so as to be swingable up and down.

* * * * *